US012656992B2

(12) United States Patent　　　(10) Patent No.:　US 12,656,992 B2

Thielemans et al.　　　　　　　　(45) **Date of Patent:　*Jun. 16, 2026**

(54) VIDEO PROCESSING IN MODULAR DISPLAY SYSTEM AND METHOD

(71) Applicant: Stereyo BV, Nazareth (BE)

(72) Inventors: Robbie Thielemans, Nazareth (BE); Vince Dundee, Glendale, CA (US)

(73) Assignee: STEREYO BV, Nazareth (BE)

( * ) Notice: Subject to any disclaimer, the term of this patent is extended or adjusted under 35 U.S.C. 154(b) by 483 days.

This patent is subject to a terminal disclaimer.

(21) Appl. No.: 18/351,243

(22) Filed: Jul. 12, 2023

(65) Prior Publication Data

US 2024/0201925 A1　　Jun. 20, 2024

Related U.S. Application Data

(63) Continuation of application No. 18/322,279, filed on May 23, 2023.

(60) Provisional application No. 63/433,646, filed on Dec. 19, 2022.

(51) Int. Cl.
G06F 3/14　　　　(2006.01)
G06F 3/147　　　　(2006.01)

(52) U.S. Cl.
CPC ............ G06F 3/1446 (2013.01); G06F 3/147 (2013.01)

(58) Field of Classification Search
CPC ................................ G06F 3/1446; G06F 3/147
See application file for complete search history.

(56) References Cited

U.S. PATENT DOCUMENTS

| 5,767,818 A | 6/1998 | Nishida |
| 6,055,071 A | 4/2000 | Kuwata et al. |
| 6,483,555 B1 | 11/2002 | Thielemans et al. |
| 6,717,625 B1 | 4/2004 | Thielemans |
| 7,015,902 B2 | 3/2006 | Nagai et al. |

(Continued)

FOREIGN PATENT DOCUMENTS

| BE | 20195196 | 3/2019 |
| BE | 20195142 | 7/2019 |

(Continued)

OTHER PUBLICATIONS

Belgian Search Report from Belgian Patent Application No. BE202305595, Nov. 21, 2023.

(Continued)

*Primary Examiner* — Kyu Chae
(74) *Attorney, Agent, or Firm* — Workman Nydegger

(57)　　　　　　ABSTRACT

An active receiver card for a display is provided. The active receiver comprises a processor, a first interface, and a second interface. The first interface is configured to receive a broadcast serialized video data stream as input from a video processing system. The active receiver card is configured to be electrically connected to a tile of a display. The active receiver card further comprises a second interface configured to output control signals to a plurality of pixels of the tile of the display. The processor of the active receiver card is configured to extract from the received broadcast serialized video data stream video image data pertaining to the tile of the display, and based thereon, the active receiver card is configured to output the control signals used to control a plurality of pixels of the tile of the display.

22 Claims, 20 Drawing Sheets

(56)        References Cited

U.S. PATENT DOCUMENTS

| | | | |
|---|---|---|---|
| 7,019,721 B2 | 3/2006 | Thielemans et al. | |
| 7,071,620 B2 | 7/2006 | Devos et al. | |
| 7,071,894 B1 | 7/2006 | Thielemans et al. | |
| 7,079,092 B2 | 7/2006 | Tanghe et al. | |
| 7,102,601 B2 | 9/2006 | Devos et al. | |
| 7,157,838 B2 | 1/2007 | Thielemans et al. | |
| 7,176,861 B2 | 2/2007 | Dedene et al. | |
| 7,205,729 B2 | 4/2007 | Thielemans et al. | |
| 7,227,519 B1 | 6/2007 | Kawase et al. | |
| 7,262,753 B2 | 8/2007 | Tanghe et al. | |
| 7,301,273 B2 | 11/2007 | Dedene et al. | |
| 7,365,720 B2 | 4/2008 | Bouwens et al. | |
| 7,443,466 B2 | 10/2008 | Dedene et al. | |
| 7,777,691 B1 | 8/2010 | Nimmer et al. | |
| 7,877,910 B2 | 2/2011 | Thorjussen et al. | |
| 8,026,873 B2 | 9/2011 | Leon et al. | |
| D730,309 S | 5/2015 | Hochman et al. | |
| 9,069,519 B1 | 6/2015 | Hall | |
| 9,247,648 B2 | 1/2016 | Vanfleteren et al. | |
| D751,998 S | 3/2016 | Hochman et al. | |
| 9,380,720 B2 | 6/2016 | Thielemans et al. | |
| 9,418,927 B2 | 8/2016 | Axisa et al. | |
| 9,477,438 B1 | 10/2016 | Hochman et al. | |
| D771,844 S | 11/2016 | Hochman et al. | |
| 9,524,666 B2 | 12/2016 | Hochman et al. | |
| 9,660,403 B2 | 5/2017 | Hochman et al. | |
| 9,866,828 B1 | 1/2018 | Higdon et al. | |
| 9,953,581 B2 | 4/2018 | Lin et al. | |
| 10,009,605 B1 | 6/2018 | Yin et al. | |
| 10,229,630 B2 | 3/2019 | Lau et al. | |
| 10,325,541 B2 | 6/2019 | Hochman et al. | |
| 10,333,109 B2 | 6/2019 | Hochman et al. | |
| 10,892,297 B2 | 1/2021 | Chae et al. | |
| 10,917,679 B2 | 2/2021 | Dunning et al. | |
| 11,196,940 B2 | 12/2021 | Martin et al. | |
| 11,310,436 B2 | 4/2022 | Hochman et al. | |
| 11,328,655 B2 | 5/2022 | Sugiyama et al. | |
| 11,445,123 B2 | 9/2022 | Deighton | |
| 11,496,726 B2 | 11/2022 | Deighton | |
| 11,552,061 B2 | 1/2023 | Chae et al. | |
| 11,610,543 B2 | 3/2023 | Thielemans et al. | |
| 11,621,301 B2 | 4/2023 | Inoue | |
| 11,695,907 B2 | 7/2023 | Steudel et al. | |
| 11,881,151 B2 | 1/2024 | Thielemans et al. | |
| 11,924,560 B2 | 3/2024 | Thielemans et al. | |
| 11,948,501 B2 | 4/2024 | Thielemans et al. | |
| 11,948,506 B2 | 4/2024 | Thielemans et al. | |
| 12,080,224 B2 | 9/2024 | Thielemans et al. | |
| 12,100,363 B2 | 9/2024 | Thielemans et al. | |
| 12,112,695 B2 | 10/2024 | Thielemans et al. | |
| 12,506,923 B2 * | 12/2025 | Thielemans | H04N 21/42607 |
| 2002/0163513 A1 | 11/2002 | Tsuji | |
| 2003/0095087 A1 | 5/2003 | Libsch et al. | |
| 2003/0095138 A1 | 5/2003 | Kim et al. | |
| 2003/0128299 A1 | 7/2003 | Coleman et al. | |
| 2003/0133619 A1 | 7/2003 | Wong et al. | |
| 2004/0021626 A1 | 2/2004 | Shimizu | |
| 2004/0113875 A1 | 6/2004 | Miller et al. | |
| 2004/0207315 A1 | 10/2004 | Thielemans et al. | |
| 2004/0212582 A1 | 10/2004 | Thielemans et al. | |
| 2004/0233125 A1 | 11/2004 | Tanghe et al. | |
| 2004/0233148 A1 | 11/2004 | Tanghe et al. | |
| 2005/0017922 A1 | 1/2005 | Devos et al. | |
| 2005/0052375 A1 | 3/2005 | Devos et al. | |
| 2005/0116667 A1 | 6/2005 | Mueller et al. | |
| 2005/0122406 A1 | 6/2005 | Voss et al. | |
| 2005/0128751 A1 | 6/2005 | Roberge et al. | |
| 2005/0133761 A1 | 6/2005 | Thielemans | |
| 2005/0134525 A1 | 6/2005 | Tanghe et al. | |
| 2005/0134526 A1 | 6/2005 | Willem et al. | |
| 2005/0213128 A1 | 9/2005 | Imai et al. | |
| 2006/0022914 A1 | 2/2006 | Kimura et al. | |
| 2006/0044290 A1 | 3/2006 | Hurwitz et al. | |
| 2006/0139238 A1 | 6/2006 | Chiba et al. | |
| 2006/0290614 A1 | 12/2006 | Nathan et al. | |
| 2007/0035484 A1 | 2/2007 | Chang | |
| 2007/0046611 A1 | 3/2007 | Routley et al. | |
| 2007/0053151 A1 | 3/2007 | Capoferri et al. | |
| 2007/0081357 A1 | 4/2007 | Kim et al. | |
| 2007/0165197 A1 | 7/2007 | Yamada | |
| 2007/0175599 A1 | 8/2007 | Froese | |
| 2007/0216628 A1 | 9/2007 | Ju et al. | |
| 2007/0241988 A1 | 10/2007 | Zerphy et al. | |
| 2007/0253008 A1 | 11/2007 | Edge et al. | |
| 2007/0263394 A1 | 11/2007 | Thielemans et al. | |
| 2008/0046217 A1 | 2/2008 | Polonskiy et al. | |
| 2008/0079756 A1 | 4/2008 | Akai et al. | |
| 2008/0079816 A1 | 4/2008 | Yen et al. | |
| 2008/0111773 A1 | 5/2008 | Tsuge | |
| 2008/0165081 A1 | 7/2008 | Lawther et al. | |
| 2008/0238950 A1 | 10/2008 | Saglam | |
| 2008/0246701 A1 | 10/2008 | Park et al. | |
| 2008/0285981 A1 | 11/2008 | Diab et al. | |
| 2008/0303756 A1 | 12/2008 | Smith | |
| 2009/0001253 A1 | 1/2009 | Blaut et al. | |
| 2009/0009103 A1 | 1/2009 | Mckechnie et al. | |
| 2009/0033601 A1 | 2/2009 | Lee et al. | |
| 2009/0066631 A1 | 3/2009 | Lianza | |
| 2009/0102769 A1 | 4/2009 | Kouno et al. | |
| 2009/0102957 A1 | 4/2009 | Phelan | |
| 2009/0103200 A1 | 4/2009 | Feklistov et al. | |
| 2009/0295706 A1 | 12/2009 | Feng | |
| 2010/0001648 A1 | 1/2010 | De Clercq et al. | |
| 2010/0103200 A1 | 4/2010 | Langendijk | |
| 2010/0243025 A1 | 9/2010 | Bhatia et al. | |
| 2010/0289783 A1 | 11/2010 | Leppla | |
| 2010/0302284 A1 | 12/2010 | Karaki | |
| 2010/0309218 A1 | 12/2010 | Suen et al. | |
| 2011/0103013 A1 | 5/2011 | Furukawa | |
| 2011/0121761 A1 | 5/2011 | Zhao | |
| 2011/0126992 A1 | 6/2011 | Yordanova | |
| 2011/0176029 A1 | 7/2011 | Boydston et al. | |
| 2011/0253319 A1 | 10/2011 | Schaupp | |
| 2011/0267501 A1 | 11/2011 | Westhues et al. | |
| 2012/0019633 A1 | 1/2012 | Holley | |
| 2012/0033876 A1 | 2/2012 | Momeyer et al. | |
| 2012/0056916 A1 | 3/2012 | Ryu et al. | |
| 2012/0062622 A1 | 3/2012 | Koyama et al. | |
| 2012/0133837 A1 | 5/2012 | Furukawa | |
| 2012/0287289 A1 | 11/2012 | Steinberg et al. | |
| 2012/0307243 A1 | 12/2012 | Elliott | |
| 2012/0313979 A1 | 12/2012 | Matsuura | |
| 2012/0327108 A1 | 12/2012 | Kato et al. | |
| 2013/0088171 A1 | 4/2013 | Fensore | |
| 2013/0162696 A1 | 6/2013 | Matsumoto | |
| 2013/0181884 A1 | 7/2013 | Perkins et al. | |
| 2013/0194199 A1 | 8/2013 | Lynch et al. | |
| 2013/0226495 A1 | 8/2013 | Marcu et al. | |
| 2013/0249377 A1 | 9/2013 | Hamer et al. | |
| 2013/0272023 A1 | 10/2013 | Lai | |
| 2013/0286000 A1 | 10/2013 | Han et al. | |
| 2013/0321254 A1 | 12/2013 | Kim | |
| 2014/0002718 A1 | 1/2014 | Spielberg | |
| 2014/0009485 A1 | 1/2014 | Asanuma | |
| 2014/0009505 A1 | 1/2014 | Moon et al. | |
| 2014/0049571 A1 | 2/2014 | Erinjippurath et al. | |
| 2014/0049983 A1 | 2/2014 | Nichol et al. | |
| 2014/0125818 A1 | 5/2014 | Friend | |
| 2014/0139740 A1 | 5/2014 | Ohba et al. | |
| 2015/0070402 A1 | 3/2015 | Shah et al. | |
| 2015/0103105 A1 | 4/2015 | Kim et al. | |
| 2015/0170399 A1 | 6/2015 | Li et al. | |
| 2015/0186097 A1 | 7/2015 | Hall | |
| 2015/0229919 A1 | 8/2015 | Weber et al. | |
| 2015/0237343 A1 | 8/2015 | Shiohara et al. | |
| 2015/0339977 A1 | 11/2015 | Nathan et al. | |
| 2015/0348479 A1 | 12/2015 | Kim et al. | |
| 2015/0371405 A1 | 12/2015 | Zhao | |
| 2016/0005355 A1 | 1/2016 | Wen et al. | |
| 2016/0078802 A1 | 3/2016 | Liang et al. | |
| 2016/0124091 A1 | 5/2016 | Kawahito et al. | |
| 2016/0133184 A1 | 5/2016 | Gupta et al. | |
| 2016/0155384 A1 | 6/2016 | Kim et al. | |
| 2016/0182790 A1 | 6/2016 | Horesh | |

(56)　　　　References Cited

U.S. PATENT DOCUMENTS

| | | |
|---|---|---|
| 2016/0275835 A1 | 9/2016 | Yuan et al. |
| 2016/0291747 A1 | 10/2016 | Fischer |
| 2016/0335958 A1 | 11/2016 | Huang et al. |
| 2017/0005077 A1 | 1/2017 | Kim et al. |
| 2017/0032715 A1 | 2/2017 | Sutherland et al. |
| 2017/0032742 A1 | 2/2017 | Piper et al. |
| 2017/0061924 A1 | 3/2017 | Lee et al. |
| 2017/0069871 A1 | 3/2017 | Yim et al. |
| 2017/0084253 A1 | 3/2017 | Li et al. |
| 2017/0171492 A1 | 6/2017 | Naito |
| 2017/0263189 A1 | 9/2017 | Wen |
| 2017/0284630 A1 | 10/2017 | Sergenese et al. |
| 2017/0301296 A1 | 10/2017 | Pappas et al. |
| 2017/0318178 A1 | 11/2017 | Debevec et al. |
| 2018/0018793 A1 | 1/2018 | Min et al. |
| 2018/0060014 A1 | 3/2018 | Son et al. |
| 2018/0090102 A1 | 3/2018 | Chappalli et al. |
| 2018/0091860 A1 | 3/2018 | Stokking et al. |
| 2018/0131160 A1 | 5/2018 | Zhang et al. |
| 2018/0235052 A1 | 8/2018 | Tada |
| 2018/0240409 A1* | 8/2018 | Li ............................ G09G 5/006 |
| 2018/0342224 A1 | 11/2018 | Beon et al. |
| 2019/0043446 A1 | 2/2019 | Suzuki et al. |
| 2019/0064923 A1 | 2/2019 | Taniguchi |
| 2019/0080656 A1 | 3/2019 | Herranz et al. |
| 2019/0098293 A1 | 3/2019 | Lee et al. |
| 2019/0132560 A1 | 5/2019 | Grosse et al. |
| 2019/0172404 A1 | 6/2019 | Zhu |
| 2019/0209858 A1 | 7/2019 | Slaughter et al. |
| 2019/0212719 A1 | 7/2019 | Ono |
| 2019/0213951 A1 | 7/2019 | Li et al. |
| 2019/0244561 A1 | 8/2019 | Zong et al. |
| 2019/0251929 A1 | 8/2019 | Fossati et al. |
| 2019/0279553 A1 | 9/2019 | Vahid Far et al. |
| 2019/0295457 A1 | 9/2019 | Li et al. |
| 2019/0306477 A1 | 10/2019 | Nordback |
| 2019/0356940 A1 | 11/2019 | Mallett |
| 2019/0364309 A1 | 11/2019 | Von Braun et al. |
| 2019/0377535 A1 | 12/2019 | Rycyna et al. |
| 2020/0005699 A1 | 1/2020 | Yi et al. |
| 2020/0014904 A1 | 1/2020 | Wetzstein et al. |
| 2020/0027386 A1 | 1/2020 | Wang et al. |
| 2020/0037011 A1 | 1/2020 | Zong et al. |
| 2020/0043201 A1 | 2/2020 | Tanaka et al. |
| 2020/0084341 A1* | 3/2020 | Hundemer ......... H04N 21/4312 |
| 2020/0098333 A1 | 3/2020 | Marcu |
| 2020/0103705 A1 | 4/2020 | Chen et al. |
| 2020/0126501 A1 | 4/2020 | Yamazaki et al. |
| 2020/0160791 A1 | 5/2020 | Chung |
| 2020/0184862 A1 | 6/2020 | Kim et al. |
| 2020/0225903 A1 | 7/2020 | Cohen |
| 2020/0280761 A1 | 9/2020 | Staples |
| 2020/0286424 A1 | 9/2020 | Thielemans et al. |
| 2020/0388210 A1 | 12/2020 | Thielemans et al. |
| 2020/0388737 A1 | 12/2020 | Ahn et al. |
| 2020/0403117 A1 | 12/2020 | Fabien et al. |
| 2021/0005161 A1 | 1/2021 | Lee |
| 2021/0014385 A1 | 1/2021 | Boggavarapu et al. |
| 2021/0027724 A1* | 1/2021 | Murai .................. G09G 3/3426 |
| 2021/0056937 A1 | 2/2021 | Sakai |
| 2021/0124174 A1 | 4/2021 | Tokunaga et al. |
| 2021/0125545 A1 | 4/2021 | Sohn et al. |
| 2021/0125570 A1 | 4/2021 | Kang et al. |
| 2021/0150998 A1 | 5/2021 | Jo et al. |
| 2021/0185778 A1 | 6/2021 | Otten |
| 2021/0201769 A1 | 7/2021 | Morris et al. |
| 2021/0217157 A1 | 7/2021 | Han et al. |
| 2021/0225267 A1 | 7/2021 | Thielemans et al. |
| 2021/0227270 A1 | 7/2021 | Braun |
| 2021/0266624 A1 | 8/2021 | Zong et al. |
| 2021/0295766 A1 | 9/2021 | Sugiyama et al. |
| 2021/0297717 A1 | 9/2021 | Braun |
| 2021/0306394 A1 | 9/2021 | Zong et al. |
| 2021/0321032 A1 | 10/2021 | Braun |
| 2021/0329265 A1 | 10/2021 | Wang et al. |
| 2021/0345058 A1 | 11/2021 | Itakura et al. |
| 2021/0366345 A1 | 11/2021 | Tseng et al. |
| 2021/0366411 A1 | 11/2021 | Yang et al. |
| 2021/0383842 A1 | 12/2021 | Han et al. |
| 2021/0397398 A1 | 12/2021 | Han et al. |
| 2022/0005880 A1 | 1/2022 | Inoue |
| 2022/0014728 A1 | 1/2022 | Deighton |
| 2022/0020727 A1 | 1/2022 | Noh et al. |
| 2022/0059045 A1 | 2/2022 | Kobayashi et al. |
| 2022/0059473 A1 | 2/2022 | Park |
| 2022/0059607 A1 | 2/2022 | Murugan et al. |
| 2022/0060612 A1 | 2/2022 | Hochman et al. |
| 2022/0076615 A1 | 3/2022 | Ding et al. |
| 2022/0103738 A1 | 3/2022 | Deighton |
| 2022/0150456 A1 | 5/2022 | Steudel et al. |
| 2022/0191109 A1 | 6/2022 | Chen et al. |
| 2022/0201354 A1 | 6/2022 | Trussart |
| 2022/0246670 A1 | 8/2022 | Chen et al. |
| 2022/0254317 A1 | 8/2022 | Hochman et al. |
| 2022/0350562 A1 | 11/2022 | Wang et al. |
| 2022/0375387 A1 | 11/2022 | Deighton |
| 2022/0375403 A1 | 11/2022 | Cheng et al. |
| 2022/0382504 A1 | 12/2022 | Cioarga et al. |
| 2022/0413790 A1 | 12/2022 | Cai et al. |
| 2023/0013582 A1 | 1/2023 | Wang et al. |
| 2023/0154399 A1 | 5/2023 | Thielemans et al. |
| 2023/0162400 A1 | 5/2023 | Liu et al. |
| 2023/0162662 A1 | 5/2023 | Zhang et al. |
| 2023/0163142 A1 | 5/2023 | Lu et al. |
| 2023/0186821 A1 | 6/2023 | Hashempour et al. |
| 2023/0209207 A1 | 6/2023 | Hochman et al. |
| 2023/0274693 A1 | 8/2023 | Thielemans et al. |
| 2023/0282153 A1 | 9/2023 | Thielemans et al. |
| 2023/0298503 A1 | 9/2023 | Zhang et al. |
| 2023/0326175 A1 | 10/2023 | Zhang et al. |
| 2024/0022686 A1 | 1/2024 | Thielemans et al. |
| 2024/0044465 A1 | 2/2024 | Thielemans et al. |
| 2024/0062706 A1 | 2/2024 | Kim et al. |
| 2024/0201924 A1* | 6/2024 | Thielemans ............ G06F 3/147 |
| 2024/0247947 A1 | 7/2024 | Zeng |

FOREIGN PATENT DOCUMENTS

| | | |
|---|---|---|
| BE | 1026226 A1 | 11/2019 |
| CN | 102290003 A | 12/2011 |
| CN | 202249669 U | 5/2012 |
| CN | 206741357 U | 12/2017 |
| CN | 207352560 U | 5/2018 |
| CN | 110602875 A | 12/2019 |
| CN | 110617000 A | 12/2019 |
| CN | 209875003 U | 12/2019 |
| DE | 102006054856 A1 | 1/2009 |
| EP | 1172783 A1 | 1/2002 |
| EP | 1780798 A1 | 5/2007 |
| EP | 2323072 A1 | 5/2011 |
| EP | 3099058 A1 | 11/2016 |
| EP | 3139422 A2 | 3/2017 |
| FR | 2945072 A1 | 11/2010 |
| GB | 2469819 A | 11/2010 |
| JP | 2001082058 A | 3/2001 |
| JP | 2007062892 A | 3/2007 |
| JP | 2019214445 A | 12/2019 |
| KR | 20170065163 A | 6/2017 |
| TW | 200608327 A | 3/2006 |
| TW | 200608328 A | 3/2006 |
| WO | 2013186278 A1 | 12/2013 |
| WO | 2015114720 A1 | 8/2015 |
| WO | 2018164105 A1 | 9/2018 |
| WO | 2019215219 A1 | 11/2019 |
| WO | 2020253249 A1 | 12/2020 |
| WO | 2021009719 A1 | 1/2021 |
| WO | 2022013191 A1 | 1/2022 |
| WO | 2022064062 A1 | 3/2022 |
| WO | 2022087322 A1 | 4/2022 |

OTHER PUBLICATIONS

Response to Belgian Search Report from Belgian Patent Application No. BE2023/5595, filed Mar. 21, 2024.

(56) References Cited

OTHER PUBLICATIONS

Extended European Search Report from European Patent Application No. EP23185674.1, Nov. 16, 2023.
Partial European Search Report from European Patent Application No. EP23198096, Nov. 29, 2023.
Extended European Search Report from European Patent Application No. EP23198096.2, Apr. 9, 2024.
Extended European Search Report from European Patent Application No. EP23190432.7, Feb. 12, 2024.
Extended European Search Report from European Patent Application No. EP23160521, Jul. 6, 2023.
Response to Extended European Search Report from European Patent Application No. EP23160521, dated Jan. 29, 2024.
Extended European Search Report from European Patent Application No. EP23218322.8, Mar. 27, 2024.
Extended European Search Report from European Patent Application No. EP23218336.8, Apr. 10, 2024.
Partial European Search Report from European Patent Application No. EP23218348.3, Apr. 30, 2024.
Extended European Search Report from European Patent Application No. EP23218353.3, Mar. 26, 2024.
Extended European Search Report from European Patent Application No. EP23218356.6, Apr. 5, 2024.
Extended European Search Report from European Patent Application No. EP23218377.2, Apr. 24, 2024.
Framework. Video, "Driver Architectures of Current Displays and their Limitations", retrieved from <https://framework.video/driver-architectures/> on Jun. 17, 2025, 8 pages.
Wikipedia, "Active matrix", retrieved from <https://en.wikipedia.org/wiki/Active_matrix> on Jun. 17, 2025, 2 pages.
Wikipedia, "Passive matrix addressing", retrieved from <https://en.wikipedia.org/wiki/Passive_matrix_addressing> on Jun. 17, 2025, 2 pages.
Belgian Search Report from Belgian Patent Application No. BE202305665, Apr. 29, 2024.
European Search Report from European Patent Application No. EP23218348.3, Sep. 13, 2024.
Extended European Search Report from Corresponding European Patent Application No. EP23218322.8, Mar. 27, 2024.
Baker, Simon, "Pulse Width Modulation (PWM)", Mar. 17, 2015, 13 pages, TFT Central.
Burr, David, "Motion Perception: Human Psychophysics", Apr. 18, 2013, pp. 763-776, MIT Press.
Cast, Inc., "Understanding—and Reducing—Latency in Video Compression Systems", Oct. 25, 2013, 7 pages, retrieved from <https://web.archive.org/web/20131025202911/https://www.design-reuse.com/articles/33005/understanding-latency-in-video-compression-systems.html>.
Davis et al., "Humans perceive flicker artifacts at 500 Hz", Feb. 3, 2015, 4 pages, Nature, Scientific Reports.
Kang et al., "Nanoimprinted Semitransparent Metal Electrodes and Their Application in Organic Light-Emitting Diodes," May 21, 2007, 6 pages, Advanced Materials.

Larson, Jennifer, "How Many Frames Per Second Can the Human Eye See?", Oct. 20, 2020, 12 pages, retrieved from <https://www.healthline.com/health/human-eye-fps>.
Lee et al., "Solution-Processed Metal Nanowire Mesh Transparent Electrodes", Jan. 12, 2008, pp. 689-692, Nano Letters, vol. 8, No. 2.
Mackin et al., "High Frame Rates and the Visibility of Motion Artifacts", Jun. 30, 2017, 19 pages, SMPTE Motion Imaging Journal, vol. 126, Issue 5.
Thielemans, Robbie, "Displays Applications of LEDs", Handbook of Visual Display Technology, May 21, 2011, 14 pages.
Thielemans, Robbie, "LED Display Applications and Design Considerations", Handbook of Visual Display Technology, May 21, 2011, 5 pages, retrieved from https://link.springer.com/referenceworkentry/10.1007/978-3-540-79567-4_76.
Tobii Connect, "The speed of human visual perception", Sep. 14, 2022, 1 page, retrieved from <https://connect.tobii.com/s/article/the-speed-of-human-perception?language=en_US>.
Wikipedia, "MAC Address", 10 pages, retrieved from <https://en.wikipedia.org/wiki/MAC_address>.
Wilson, Derek, "Exploring Input Lag Inside Out", Jul. 16, 2019, 2 pages, retrieved from <https://www.anandtech.com/show/2803>.
Zhang, Yin, "Performance Characteristics of Lithium Coin Cells for Use in Wireless Sensing Systems", Jun. 17, 2012, 143 pages, All Theses and Dissertations, Brigham Young University.
"The Ins and Outs of HDR—Gamma Curves", Jun. 8, 2020, 3 pages, retrieved from <https://www.eizoglobal.com/library/management/ins-and-outs-of-hdr/index2.html>.
Extended European Search Report from corresponding EP Application No. EP18198749.6, Nov. 12, 2018.
International Search Report and Written Opinion from PCT Application No. PCT/EP2019/061804, Jun. 13, 2019.
Applicant's Amendment/Remarks filed at the EPO on Feb. 20, 2020 for PCT/EP2019/061804.
Applicant's Amendment/Remarks filed at the EPO on May 26, 2020 for PCT/EP2019/061804.
International Preliminary Report on Patentability from PCT/EP2019/061804, Jul. 10, 2020.
Belgian Search Report from BE Application No. 201905196, Aug. 13, 2019.
Search Report for BE 2019/05759 mailed Jan. 23, 2020, 18 pages.
Belgian Search Report for Belgian Patent Application No. BE2019/5970, Jul. 24, 2020.
Response to Belgian Search Report for Belgian Patent Application No. BE2019/5970, filed by Applicant at the Belgian Patent Office on Nov. 24, 2020.
Belgian Search Report from corresponding Belgian Application No. BE 202205007, Jun. 7, 2022.
Extended European Search Report from corresponding EP Application No. 22185014.2, Dec. 8, 2022.
Office Action from European Application No. 19722133.6, Jan. 19, 2023.

* cited by examiner

Hub Board
250

Receiver Card
240

LED Tile without
"backpack"
230

LED
Display
Module
220

LED Tile
"Backpack"
210

FIG. 5  (prior-art)

IEEE 802.3 Ethernet Frame Format

| 7 byte | 1 byte | 6 byte | 6 byte | 2 byte | 46 to 1500 byte | 4 byte |
|---|---|---|---|---|---|---|
| Preamble | Start Frame Delimiter | Destination Address | Source Address | Length | Data | Frame Check Sequence (CRC) |
| 1310 | 1320 | 1330 | 1340 | 1350 | 1360 | 1370 |

Ethernet Header (14 byte) 1390

Ethernet Data Packet
1380

FIG. 13

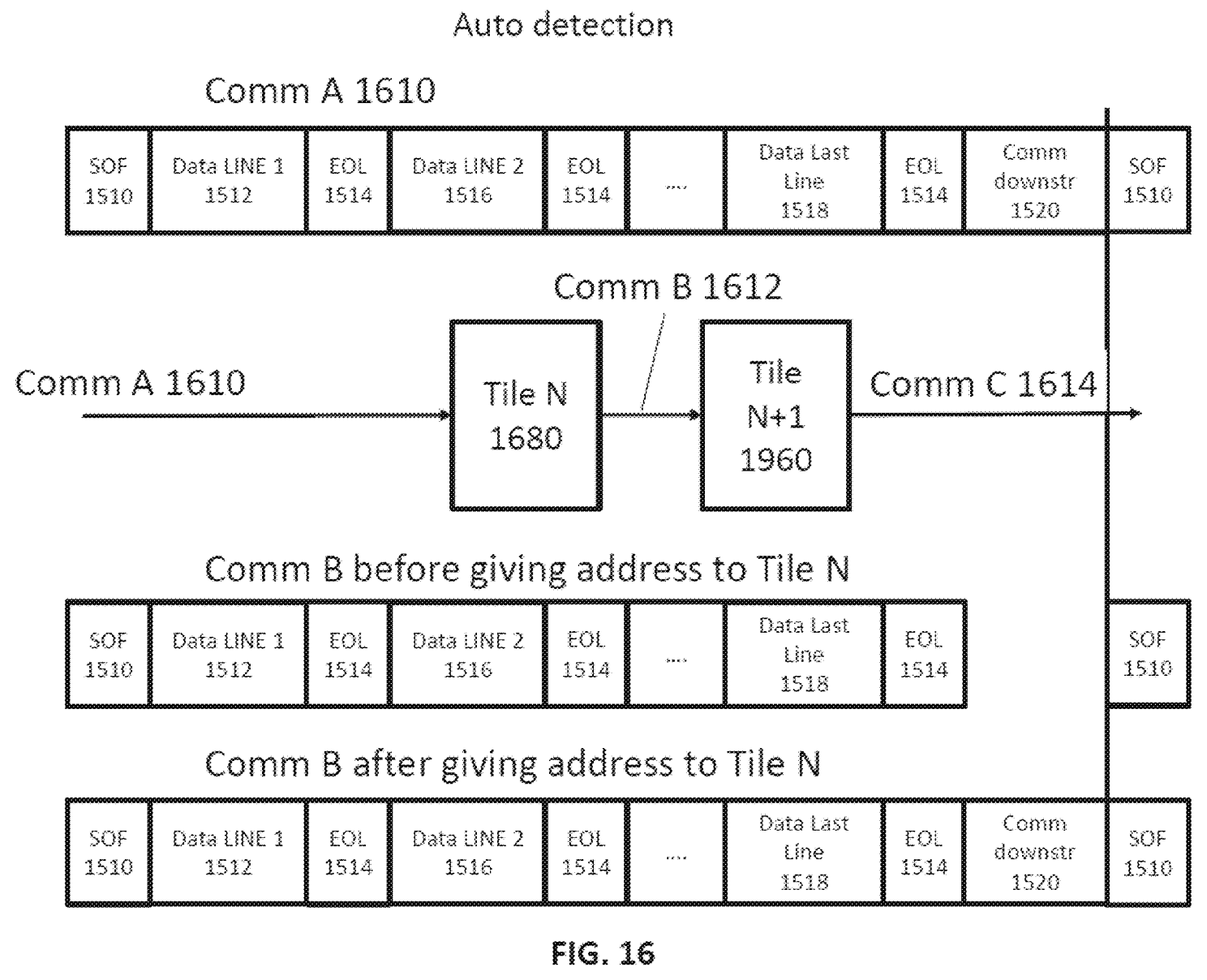

Auto detection

Comm A 1610

| SOF 1510 | Data LINE 1 1512 | EOL 1514 | Data LINE 2 1516 | EOL 1514 | ... | Data Last Line 1518 | EOL 1514 | Comm downstr 1520 | SOF 1510 |

Comm A 1610

Comm B 1612

Tile N 1680 → Tile N+1 1960

Comm C 1614

Comm B before giving address to Tile N

| SOF 1510 | Data LINE 1 1512 | EOL 1514 | Data LINE 2 1516 | EOL 1514 | ... | Data Last Line 1518 | EOL 1514 | SOF 1510 |

Comm B after giving address to Tile N

| SOF 1510 | Data LINE 1 1512 | EOL 1514 | Data LINE 2 1516 | EOL 1514 | ... | Data Last Line 1518 | EOL 1514 | Comm downstr 1520 | SOF 1510 |

FIG. 16

VIDEO PROCESSING IN MODULAR DISPLAY SYSTEM AND METHOD

CROSS-REFERENCE TO RELATED APPLICATIONS

This application is a continuation of U.S. application Ser. No. 18/322,279, filed May 23, 2023, which claims the benefit of and priority to U.S. Provisional Patent Application Ser. No. 63/433,646 filed on Dec. 19, 2022 and entitled "Modular Display with Integrated on Camera Feature Sets," which is expressly incorporated herein by reference.

TECHNICAL FIELD

This disclosure relates to a video processing system, and particularly to a video processing system that generates and/or uses a serialized video protocol for delivering video data to a display system. As disclosed herein, the video processing system, in particular, provides a simplified data path from which a display system may read data for eventual display by one or more display components. Also disclosed is a method of reading data from a video data stream such that specific devices viewing the video data stream may read only that data which pertains to itself and allow all data untouched to pass through it, even data that pertains to itself.

BACKGROUND

There are several methods by which video data may be delivered to a display. Generally, related LED systems are based upon a topology where a processor takes in the desired video data via, for example, an HDMI or SDI cable and performs various calculations and remapping functions on the video data. After these calculations are performed, the data is usually compressed before sending the results, via an ethernet or ethernet-like cable, to a breakout box. Depending on the LED tile resolution and the available bandwidth, one often needs to manually calculate (see calculations below) how many LED tiles one can connect in a loop from any single cable coming from an output of the breakout box. Ethernet or ethernet-like cables are then distributed over a number of LED tiles based on the results of the calculations, as shown in FIGS. 1 and 3.

The LED tiles often comprise multiple LED Display Modules (LDMs). The LDMs are usually mounted to a mechanical frame electrically connected to the hub board (a.k.a., hub card). The hub card serves as an electrical interface between the LDMs, a power supply, an ethernet or ethernet-like cable, and the receiver card (FIG. 4). The receiver card may be analogized to the heart of the LED tile and contains the digital logic for driving the LEDs. The LDMs usually have a multiplexing layout wherein LEDs are connected on one side to the multiplexing and on the other side to Constant Current Drivers (CCDs).

The calculation to determine how many LED tiles one can connect in a loop from any single ethernet or ethernet-like cable from the breakout box, as mentioned above, may be performed according to the following process:

Assuming that there is a video data signal of 60 Hz which is configured for a 12-bit color depth RGB 512×512 pixel LED tile:

the total amount of bits needed for one LED tile per frame would be 512×512×3 RGB colors×12 bit/color=9,427,184 bits;

the total amount of bits available at 60 Hz is 9,427,184 bits×60 Hz=566,231,040 bits;

using a 1 Gbps ethernet an ethernet or ethernet-like cable to transmit the video data limits the number of displays that can be connected via said cable to 1,000,000,000/566,231,040=1.74 LED tiles.

It is noted that this even calculation is optimistic as it doesn't contain any overhead of the ethernet encoding and overhead for sending frames, preambles, and so on. The actual calculation is even lower with an input of a 120 Hz video signal, (usually this vertical frame refresh rate is used for showing 3D video), then Gigabit ethernet cannot be used as the minimal necessary bandwidth is 1.44 Gbps for these kinds of tiles. (The later proposed system as disclosed herein is then really the world's first high resolution processing system that can display 3D for high resolution tiles.)

The inventors of the present application have found that for these kind of applications, traditional processor topologies using ethernet or ethernet-like protocols will need to use much more expensive, high-bandwidth transmissions, such as 10 Gbps ethernet physical layer (ethernet phy) chipsets and interconnect or even use expensive fiber connection and cabling. But still then the inventors of the present application have found the significant problem that this topology—apart from being expensive—will suffer from other drawbacks such as higher latency, the difficulty of configuring the individual LED tiles and increase of processing complexity in related systems.

Some traditional processor manufacturers might also use "compression algorithms" applied to the tile ethernet or ethernet-like data streams to get below the restricted bandwidth, but this introduces pixel artifacts and (sometimes) frame artifacts, which are extremely undesirable. One example is issuing YUV video stream instead of an RGB video stream (RGB→YUV). Some even use comparison to previous video frames and hence introduce frame delay. But again, these methods provide unsatisfactory results.

SUMMARY

A video processing system is provided comprising: a video processor configured to output video data to be displayed by a display as a video image, the video data being output by the video processor is a serialized digital video stream, resembling the complete relevant video information to be displayed.

An active receiver card for a display, the active receiver comprising: a processor; a first interface configured to receive a broadcast serialized video data stream as input from a video processing system, wherein the active receiver card is configured to be electrically connected to a tile of a display; wherein the active receiver card further comprises a second interface configured to output control signals used to control a plurality of pixels of the tile of the display; wherein the processor of the active receiver card is configured to extract from the received broadcast serialized video data stream video image data pertaining to the tile of the display, and based thereon, the active receiver card is configured to output the control signals used to control a plurality of pixels of the tile of the display.

A method for controlling with an active receiver card pixels of tile of a display the active receiver card being electrically connected to a tile of the display, the method comprising: receiving by a first interface a broadcast serialized video data stream as input from a video processing system; extracting by a processor of the active receiver card, from the received broadcast serialized video data stream, video image data pertaining to the tile of the display; and based on the extracted video image data pertaining to the tile, outputting, by a second interface of the active receiver card, control signals used to control a plurality of pixels of the tile of the display.

A video processing system comprising: a video processor configured to broadcast a serialized video data stream to be displayed by a display, the video data being output by the video processor as a plurality of portions of the serialized video data stream, each of the plurality of portions of the serialized video data stream pertaining to a corresponding one of a plurality of tiles of the display, including at least a first tile and a second tile, such the plurality of portions of the broadcast serialized video data stream include at least a first portion of the serialized video data stream including video image data pertaining to the first tile of the display and a second portion of the serialized video data stream that includes video image data pertaining to the second tile of the display, wherein the video processor outputs both the first portion of the serialized video data stream and the second portion of the serialized video data stream combined as a single broadcast data stream to an active first receiver card corresponding to the first tile of the display and to a second active receiver card corresponding to the second tile of the display.

An active receiver card comprising: a processor; a first interface configured to receive input from a video processing system; and a second interface configured to output signals to a plurality of pixels of a display tile corresponding to the active receiver card, wherein the active receiver card is configured to be connected to a tile of a display comprising a plurality of tiles, wherein the active receiver card is configured to receive a plurality of portions of the video data from the video processing system, each of the plurality of portions of video data corresponding to one of the plurality of tiles of the display, and wherein the active receiver card is configured to retrieve pixel data relating to the plurality of pixels of the display tile, and based thereon, is configured to output signals to light individual pixels of the display tile.

A video processing system is provided comprising: a video processor configured to output video data to be displayed by a display as a video image, the video data being output by the video processor as a plurality of portions of the video data to be displayed by a corresponding plurality of tiles of the display, such that a first tile displays a first portion of the video image based on a first portion of the video data and a second tile displays a second portion of the video based on a second portion of the video data, wherein the video processor outputs both the first portion of the video data and the second portion of the video data to each of the first tile and the second tile.

A video processing method comprising: outputting video data to be displayed by a display as a video image, the video data being output by a video processor as a plurality of portions of the video data to be displayed by a corresponding plurality of tiles of the display, such that a first tile displays a first portion of the video image based on a first portion of the video data and a second tile displays a second portion of the video based on a second portion of the video data, wherein outputting the video data includes outputting both the first portion of the video data and the second portion of the video data to each of the first tile and the second tile.

Further, in view of the above Background, and the problems with related video processing systems and methods identified by the inventors of the present invention, an aim of the disclosure is to provide a simple, for example, serialized, video protocol for transmitting video data to all LED tiles of a display at once instead of using ethernet or ethernet-like protocols that need to send individual (personalized) data to each of the individual tiles in an LED display. In contrast to current systems, in an embodiment of the system and methods disclosed herein, all LED tiles see or are provided the entire video data transmission of the full relevant image to be displayed and hence, the tile processor may read that part of the video data that pertains to itself and simply display it. In fact, this means that the complex logic, which is typically associated with expensive, centralized video processors, is instead distributed all over the display. This might, at first, seem less cost effective. However, the impact of this decentralization on performance is immense as this non-centralized system enables the execution of more calculations and implementation of more complex algorithms since the pixels which need processing locally in the receiver card will always be less compared to the amount of pixels that are needed for full screen processing as done in related approaches. Further, by using a simple video protocol, the system (frame) latency can be reduced significantly (see later).

According to a first aspect, a video processor is provided that is configured to send a video data stream, wherein data is communicated downstream from the video processor in a higher amount than the data communicated upstream to the video processor. This may be termed an "asymmetrical" video data stream, in that the that the downstream communication (to the tiles) is of a bandwidth, data rate, or bitrate that is significantly higher than the upstream communication (back to processor). The ratio of the asymmetrical video data stream (downstream to upstream) communication may be, for example, greater than 1, or approximately, 1.05 to 1; 1.1 to 1; 1.5 to 1; 2 to 1; 3 to 1; 4 to 1; 5 to 1; 6 to 1; 7 to 1; 8 to 1; 9 to 1; 10 to 1; 15 to 1; 20 to 1; 30 to 1; 40 to 1; 50 to 1; 60 to 1; 70 to 1; 80 to 1; 90 to 1; 100 to 1; or greater, including, but not limited to, 150 to 1; 200 to 1; 300 to 1; 400 to 1; 500 to 1; 600 to 1; 700 to 1; 800 to 1; 900 to 1; 1,000 to 1; 1,500 to 1; 2,000 to 1; 3,000 to 1; 4,000 to 1; 5,000 to 1; 10,000 to 1; 20,000 to 1; 30,000 to 1; 50,000 to 1; 100,000 to 1; 200,000 to 1; 300,000 to 1; 400,000 to 1; 500,000 to 1; 1,000,000 to 1; 2,000,000 to 1; 5,000,000 to 1; 10,000,000 to 1; or greater. Further, the ratio of the asymmetrical video data stream (downstream to upstream) communication may be in the range of greater than 1-2 to 1; 1.1 to 1-5 to 1; 1.1 to 1-10 to 1; 1.1 to 1-20 to 1; 1.1 to 1-50 to 1; 1.1 to 1-100 to 1; 1.5 to 1-5 to 1; 1.5 to 1-10 to 1; 1.5 to 1-20 to 1; 1.5 to 1-50 to 1; 1.5 to 1-100 to 1; 2 to 1-5 to 1; 2 to 1-10 to 1; 2 to 1-20 to 1; 2 to 1-50 to 1; 2 to 1-100 to 1; 2 to 1-1,000 to 1; 2 to 1- 5,000 to 1; 2 to 1-10,000 to 1; 5 to 1-10 to 1; 5 to 1-20 to 1; 5 to 1-50 to 1; 5 to 1-100 to 1; 5 to 1-1,000 to 1; 5 to 1-5,000 to 1; 5 to 1-10,000 to 1; 10 to 1-20 to 1; 10 to 1-50 to 1; 10 to 1-100 to 1; 10 to 1-1,000 to 1; 10 to 1-5,000 to 1; 10 to 1-10,000 to 1; 10 to 1-50,000 to 1; 10 to 1-100,000 to 1; 100 to 1-1,000 to 1; 1,000 to 1-10,000 to 1; 1,000 to 1-100,000 to 1; 1,000 to 1-1,000,000 to 1.

The order of the data communicated need not be communicated sequentially (e.g., pixel N followed by pixel N−1, then N−2, etc.) or in other words linearly, but may be communicated out of order as long as the order the data is in is predetermine and fixed (e.g., it is predetermined and fixed that pixel N comes first, then pixel N−5, then pixel N−2, etc.). Additionally, a display is configured to display at least a part of the data communicated along the video data stream. Further, at least one receiver card is connected to or configured to receive a signal from the video processor, wherein the receiver card comprises a video transceiver/reclocker configured to capture data from the video data stream that is specific to said receiver card and to allow all video data from the video data stream to pass through said receiver card. The receiver card may further comprise non-volatile memory, volatile memory, an embedded processor, logic to mitigate the effects of synchronization banding when capturing in high-speed sync, a video/LED processor, and an interface between the receiver card and a hub board.

Additionally, individual pixel light generation may start and stop after a predefined start and stop period. The display may immediately update at the beginning of the start period. The start of the start and stop period may be based on the vertical sync signal or a programmable time to wait after a vertical sync signal. The stop of the start and stop period may be calculated by digitally measuring the time between two consecutive vertical sync signals or by calculating a fraction of the measurement between two consecutive vertical sync signals. Also, multiple pixel light generations may start and stop during the time between two vertical sync signals. Further, the start and stop conditions may be derived from a vertical sync signal and a measured camera shutter time. This embodiment may also have sync-banding capabilities.

The data communicated along the video data stream may be made up of at least 8-bit RGB pixel data but may be more or less than 8-bits. Further, the data communicated along the video data stream may be uncompressed. Additionally, the data communicated along the video data stream may also contain serialized communication data for communication with the display (typically an LED display). The display may use Pulse Width Modulation (PWM) schemes, multiplexing schemes, or active matrix schemes.

According to a second aspect, an embodiment may comprise at least two electrical interfaces. The first electrical interface may receive a video data stream, wherein the order of the data communicated along the video data stream need not be communicated sequentially as long as the data is in a predetermined and fixed order; the second electrical interface may be electronically connected directly or indirectly with a board containing one or more LEDs. Additionally, the embodiment may comprise non-volatile memory that stores at least one (x, y) coordinate of a pixel that corresponds to one LED that is mounted on the LED board. This (x, y) coordinate also corresponds to a particular pixel coordinate.

According to an embodiment, digital logic (or a processor, a controller, or other circuitry) may be implemented to determine an (a, b) coordinate pair out of data communicated along the video data stream and compare the (a, b) coordinate with an (x, y) coordinate. The digital logic may also (i) retrieve the corresponding pixel data from the data communicated along the video data stream, (ii) perform at least one mathematical operation on the retrieved data, (iii) convert the outcome of the mathematical operation to logic that can interface with the second electrical interface, and/or (iv) send corresponding signals to the board containing one or more LEDs to light up the LED in correspondence with the outcome of the mathematical operation.

According to another embodiment, a system is provided having at least three electrical interfaces, the first electrical interface being capable of receiving the data communicated along the video data stream; the second electrical interface being capable of sending the data communicated along the video data stream; and/or the third electrical interface being connected directly or indirectly with a board containing one or more LEDs. Digital logic (or a processor, a controller, or other circuitry) may be present that connects the first electrical interface to the second electrical interface. There may also be digital logic, a processor, a controller, or other circuitry to change predetermined data in the video data stream before it is presented to the second electrical interface, for example, to perform autoconfiguration, i.e., automatically detect how many tiles are present and how they need to be positioned. Additionally, the data presented to the second electrical interface may be significantly different than the data presented to the third electrical interface.

According to another embodiment, a video processing system may have at least five electrical interfaces. The first and second electrical interfaces being capable of receiving the data communicated along the video data stream with downstream communication; the third and fourth interfaces being capable of sending the data communicated along the video data stream with downstream communication; the fifth electrical interface is electronically connected directly or indirectly with a board containing one or more LEDs. There may be digital logic, a processor, a controller, or other circuitry that connects the first electrical interface to the third or fourth electrical interface and the second electrical interface to the third or fourth electrical interface. The digital logic may also (i) change predetermined data in the video data stream, received from the first and second electrical interfaces, (ii) determine activity on the first and second electrical interfaces, and (iii) retrieve pixel data from either or both of the first and the second electrical interfaces.

In an embodiment, at least one mathematical operation may be performed on the retrieved pixel data. Such operations include, but are not limited to, correction of the brightness, gamma correction, color correction, or subdelta correction. Other operations may include a calibration, a content-dependent calibration, a time-dependent calibration, a scaling function, and/or a rotation function.

Similar to the first aspect of the invention, this second aspect may perform at least one mathematical operation on the retrieved pixel data. Such operations include, but are not limited to, correction of the brightness, gamma, color, and subdelta of the display. Other operations still include calibrating the display dependent on the content of the digital serialized video data stream or the timing of the stream. Further operations may include scaling or rotation of the video data.

According to one embodiment, digital logic may be present to determine a predefined start to light up the LEDs within one video frame and/or to determine a predefined stop to light up the LEDs. Further, non-volatile memory may be included to store the predefined start and the predefined stop. The digital logic, a processor, a controller, or other circuitry may also read the non-volatile memory and, at power-up, read the non-volatile memory to determine the predefined start and the predefined stop. Multiple such starts and stop s may be used in one image frame.

According to yet another embodiment, the video processing system may comprise volatile memory to at least store pixel information before or after the performance of the aforementioned mathematical operation. Digital logic, a processor, a controller, or other circuitry may also perform (i) gamma correction, (ii) calibration, (iii) autodetection, (iv) the reading and writing of data to and from volatile memory, and (v) the storing of measurement data instead of calibration data.

In a third aspect of the invention, a video data stream, wherein the order of the data communicated along the video data stream need not be communicated sequentially as long as the data is in a predetermined and fixed order, is generated by a laptop, Personal Computer (PC), or any other existing device that has a graphical engine or Graphics Processing Unit (GPU) incorporated therein. The Graphical User Interface (GUI) for adjusting screen settings may also be integrated in the existing GUI of the graphical engines of the existing device with a graphical engine or GPU. The afore-mentioned mathematical operations may be a part of the GPU system for rendering content to be displayed on the LEDs.

According to an embodiment, the video data stream may also contain an upstream communication channel to individual communicate with one or more LEDs or LED tiles via an active receiver card. The data communicated along the video data stream may also be replaced by partially rendered data.

One can appreciate that although only three aspects of the invention are mentioned above, other aspects of the invention implementing single elements or a combination of the elements of the various three aspects are possible.

BRIEF DESCRIPTION OF THE DRAWINGS

FIG. 2a shows the LED tile with the "backpack."

FIG. 2b shows the LED tile without the "backpack."

FIG. 2c shows the "backpack" opened, but not removed.

FIG. 9a illustrates the redundancy between LED tiles in related systems.

FIG. 9b illustrates an embodiment of the proposed solution to the link break of FIG. 9a.

FIG. 9c illustrates a generalized embodiment implementing redundant data features.

FIG. 13 illustrates the standard IEEE 802.3 Ethernet Frame Format with its respective parts.

FIG. 16 illustrates an example of how a video data stream may be implemented with additional downstream communication.

FIG. 17a illustrates a 2×2 embodiment of the wiring topology of the video processing system.

FIG. 17b illustrates a 2×6 embodiment of the wiring topology of the video processing system.

DETAILED DESCRIPTION OF THE INVENTION

This patent application builds further on the same Applicant's earlier filed U.S. patent application Ser. No. 16/895,872, filed at the USPTO on Jun. 8, 2020, and U.S. patent application Ser. No. 17/865,096, filed at the USPTO on Jul. 14, 2022, which claims the benefit of priority to U.S. Provisional Patent Application 63/221,822, which was filed at the USPTO on Jul. 14, 2021, the contents of each of which are incorporated herein by reference. But this disclosure further focuses on the system and integration of the "on camera feature sets." This disclosure further focuses on a display system, which is modular in this case, as this is most complex to handle (as compared to non-modular). Nevertheless, it can also be done on non-modular displays. One of the aims of this disclosure is to provide a method, implementation, and chipset that provides: a) Reduction of system latency by altering display topology, to protect base serial digital video link and all its features; b) Redundancy of high bandwidth low latency systems; and/or c) Directly driven by graphical card.

Figure 1:
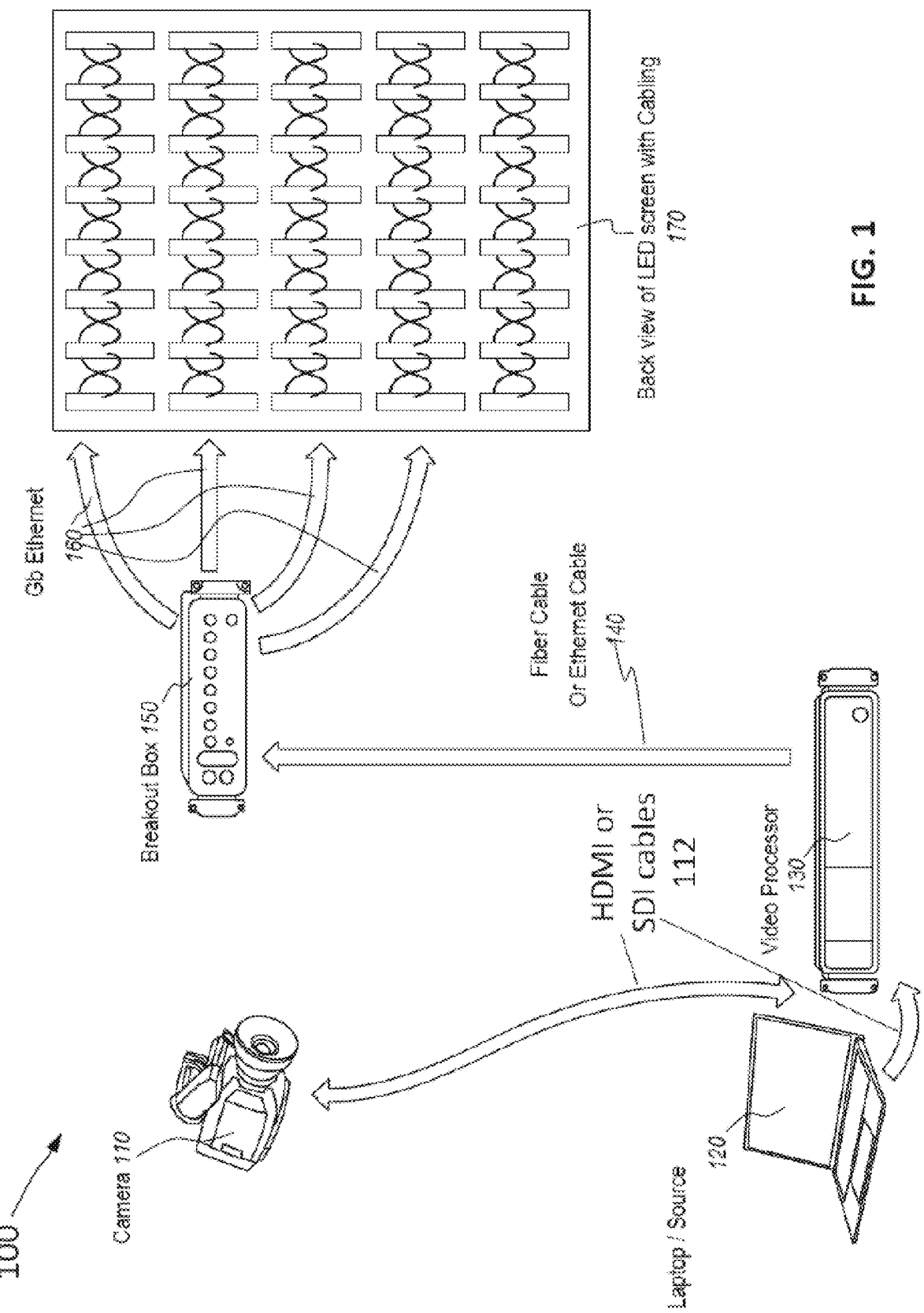
FIG. 1 illustrates traditional topologies by which related systems pass video data to an array of LED display tiles.

FIG. 1 illustrates topologies by which related a system 100 passes video data to an array of LED display tiles 170. Related LED systems in general are currently based upon similar system topologies. A processor 130 takes in the desired video image from a camera 110 or computer source 120 based upon, for example, HDMI or SDI cables, 112 and performs one or more calculations and/or remapping functions onto this original image and puts it over an ethernet or an ethernet-like cable or fiber cable 140, usually also performing compression before it sends the ethernet or ethernet-like signal to a breakout box 150. Dependent on the LED tile 330 resolution and available bandwidth, one needs to calculate manually (see calculation example in the background of the invention) how many LED tiles 330 one can connect in loop through from one cable coming from one output of the breakout box 150. Numerous ethernet cables 160 are distributed over a several amount of LED tiles 330. Unlike the system of FIG. 1 and unlike traditional systems, as described in more detail below, the system, video processor, active reader card, and methods disclosed herein do not need or require the breakout box.

Figures 2A, 2B, 2C:
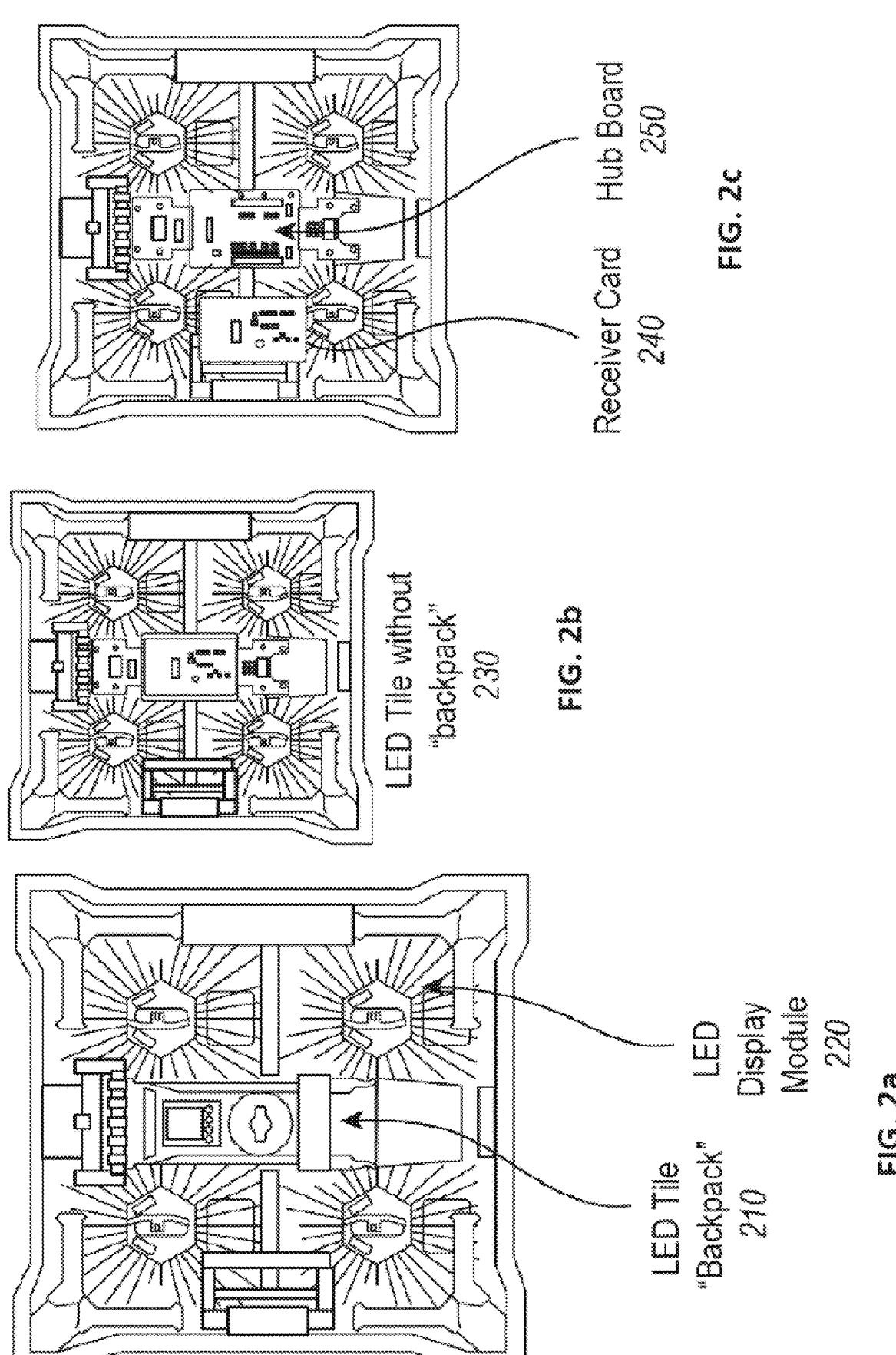
FIGS. 2a-2c illustrate and present a rear side of an LED tile as used in related systems and nomenclature thereof.

FIGS. 2a-2c illustrate and present the rear side of an LED tile 330 as used in related systems and nomenclature thereof. FIG. 2a shows the LED tile 330 with the "backpack" 210, which contains the receiver card 240, still connected to the electrical interfaces of the LED tile 330, which includes the hub board 250. FIG. 2b shows the LED tile 330 without the "backpack" 210, thus exposing the hub board 250 underneath. FIG. 2c shows the "backpack" 210 opened, but not removed, exposing the receiver card 240 on the "backpack" 210 and the hub board 250 on the LED tile 330.

Figure 3:
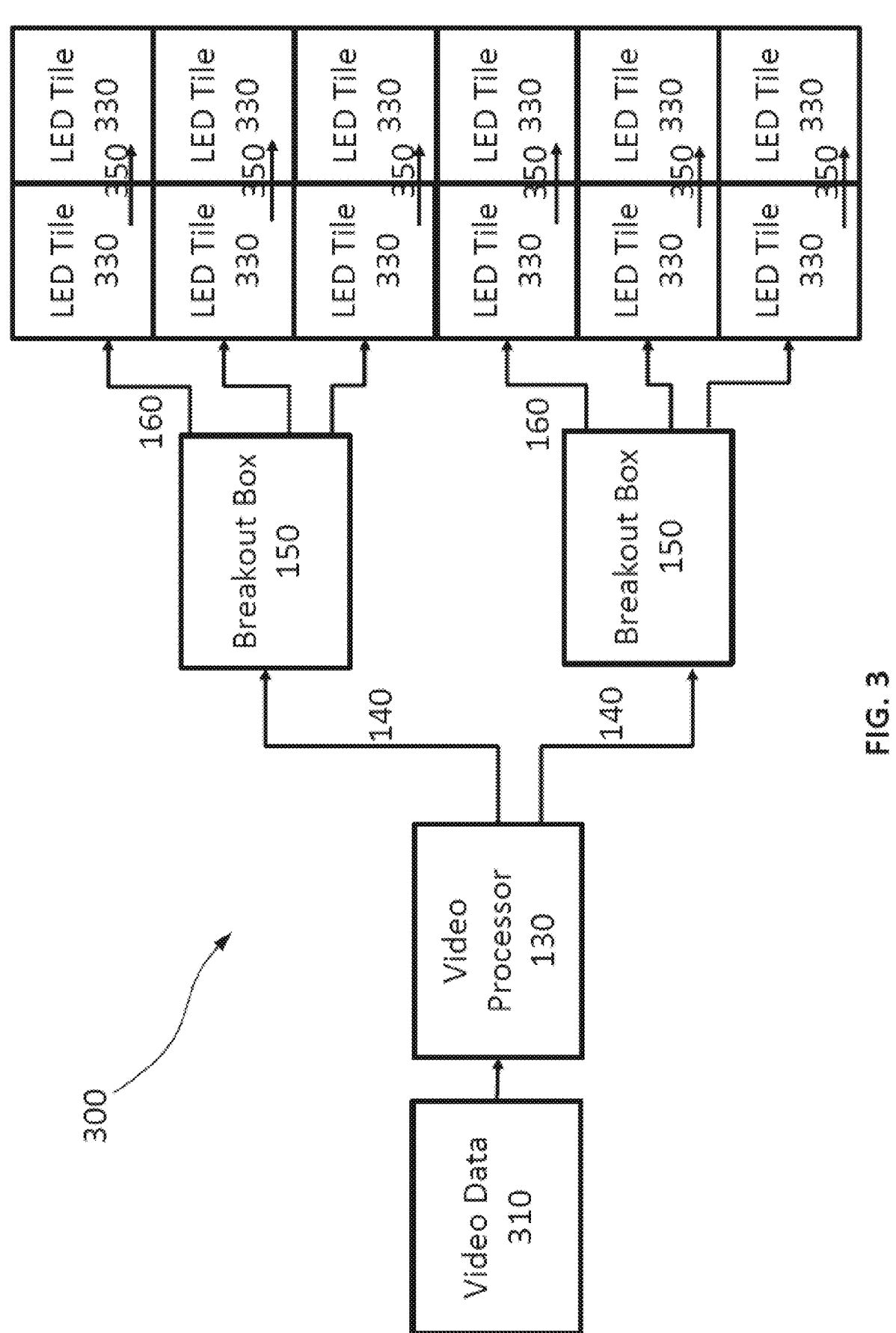
FIG. 3 illustrates a box diagram of a related traditional LED display system similar to FIG. 1.

FIG. 3 illustrates a box diagram of a related modular LED display system 300 similar to FIG. 1. These related systems 300 have low flexibility. Usually, a complicated user interface is needed to configure the images that need to be sent to the correct LED tiles 330. Further, this system topology has an enormous influence on the processing power that is needed in the video processor 130 to reconfigure all IP addresses or MAC addresses of the LED tiles 330 dynamically. One needs to always reposition the video data 310 in the memory of the processor for the necessary LED tiles 330.

Video Compression Techniques

Figure 5:
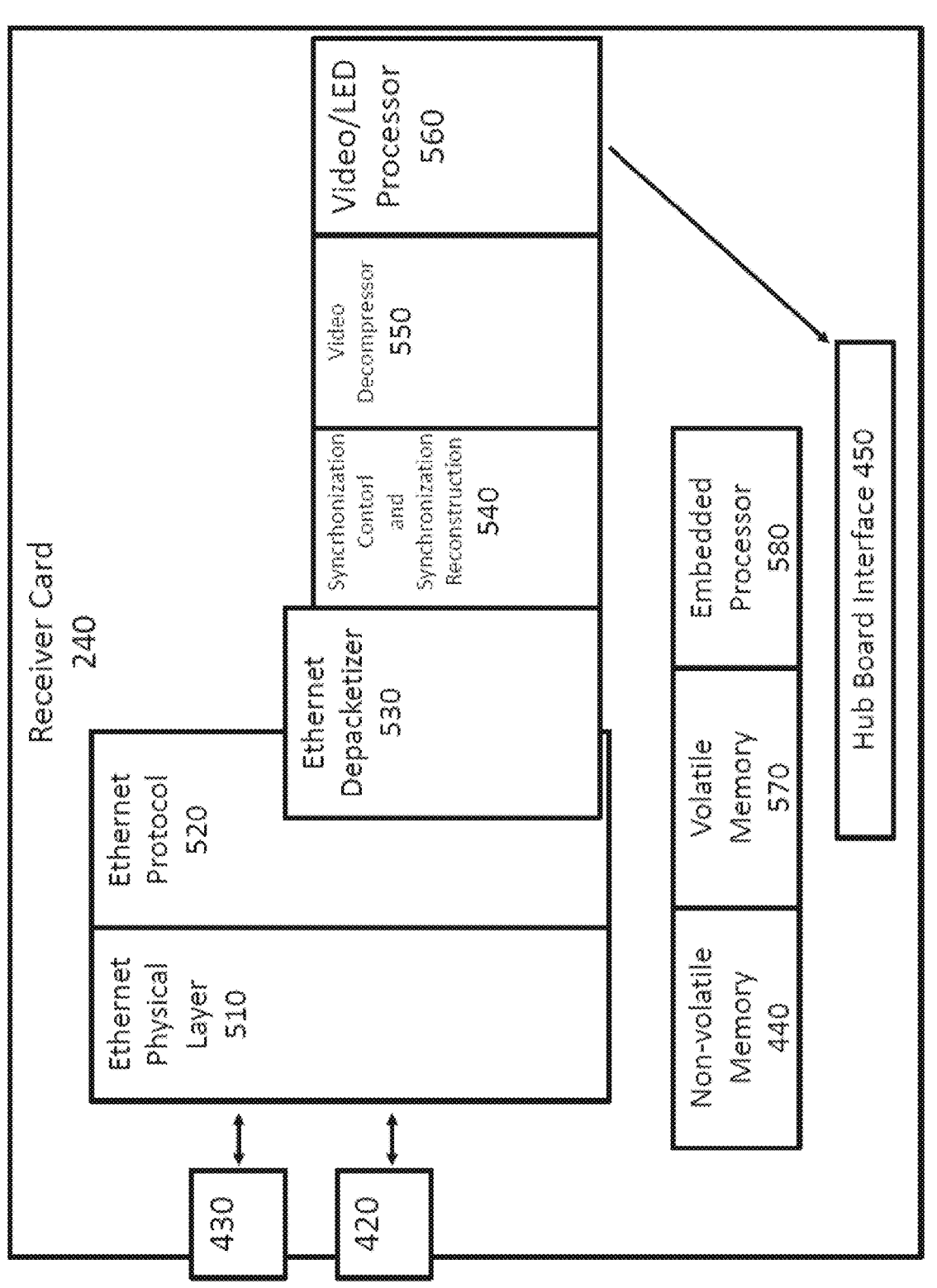
FIG. 5 illustrates the traditional components of receiver cards of related systems.

One of the simplest video compression techniques is converting RGB signals to YUV signals (component video). This technique does not introduce significant delay but has a negative impact on display performance. Other compression techniques—especially those that use comparative parts of frame techniques—introduce one frame of delay. Previous frames may be stored. This is compared to the actual frame and the derived information of the difference is sent the next frame; not only the compression itself has a negative effect on latency, but also the decompression of the data. Heavy compression can, dependent on computing power, introduce at least two frames of delay. Decompression logic can be part of, e.g., the breakout boxes 150, as can be seen in FIGS. 1 and 3. If this part does not include decompression, then it needs to be included in the receiver card 240 (FIG. 5). As an LED display uses RGB LEDs, most of the video processing happens in the RGB space, so YUV may be or is often converted to RGB and for the sake of this document, this is considered a decompression, although it has less impact on latency (because it can go very quickly from YUV to RGB). It is noted that, e.g., 4:2:2 decompression introduces at least one to two lines of delay.

It is noted that this excludes even the frame delay introduced by video scaling and/or rotation algorithms to scale, e.g., a 1920×1080 video canvas size to 180×720 or perform a rotation.

Figure 4:
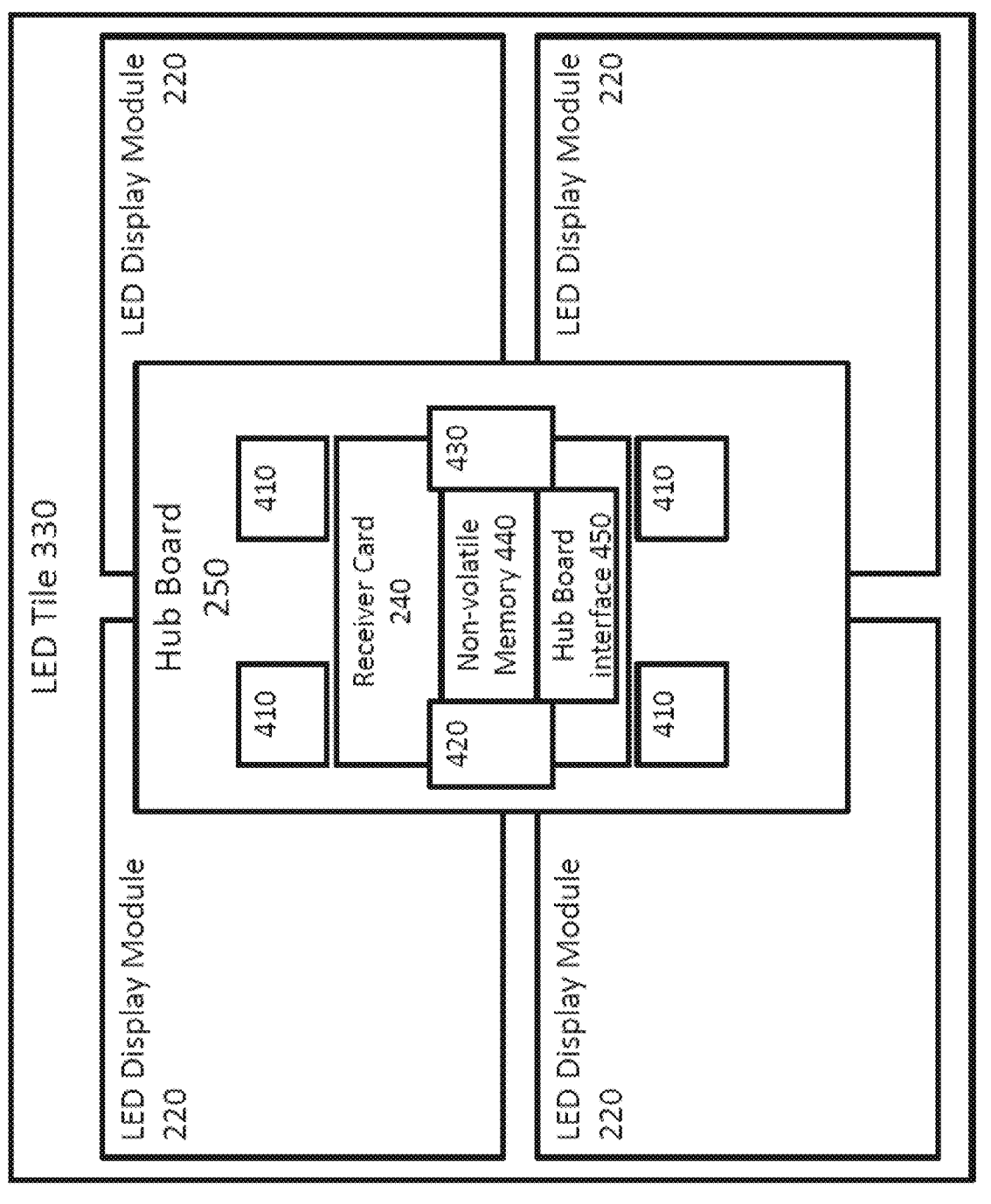
FIG. 4 illustrates how related LED tiles may be configured.

FIG. 4 illustrates how related LED tiles 330 are typically configured. An amount of LED Display modules 220 (also called LDMs—LED boards with usually a simple mechanical housing) are plugged into a mechanical frame and electrical contact is made with a "hub board" or "hub card" 250. Here, four LDMs are shown, but the number of LDMs may be more or less than four. The hub board 250 is in fact an electrical interface between the LDMs 220, a power supply, and ethernet (RJ45) cable ports 420, 430 and the receiver card 240. However, these cable ports 420, 430 are not limited to connecting just ethernet cables, which are simply an example. Other types of cabling may be used to connect to the receiver card depending on the receiver card's 240 architecture. The receiver card 240 is the heart of the LED tile and contains the logic for driving the LEDs. The LDMs 220 usually have a multiplexing layout wherein LEDs are connected on one side to the multiplexing and on the other side to CCDs or constant current drivers. Also shown in FIG. 4 are the wired and/or wireless connections 410 to the hub board 250. These connections 410 provide access points to additional hardware such as gyroscopes, accelerometers, and much more. Additionally, non-volatile memory 440 is provided on the receiver card 240. The receiver card 240 interfaces with the hub board 240 via the hub board interface 450 built into the receiver card 240.

FIG. 5 illustrates the components of receiver cards 240 of related systems 300. The cable ports 420, 430 are connected to an ethernet physical layer 510 (a.k.a. ethernet "phy") to facilitate physical layer functions. Data 310 received via the cable ports 420, 430 needs to be depacketized by the ethernet depacketizer 530 so that the data can be used. The data 310 is then decompressed in the video decompressor 550 where the video/LED processor 560 takes that resultant data and sends it to the hub board 250 via the hub board interface 450. The receiver card 240, as mentioned previously, also has non-volatile memory 440 to, for example, to store MAC addresses; volatile memory 570 to, for example, store incoming ethernet data packets 1380; and an embedded processor 580.

Figure 6:
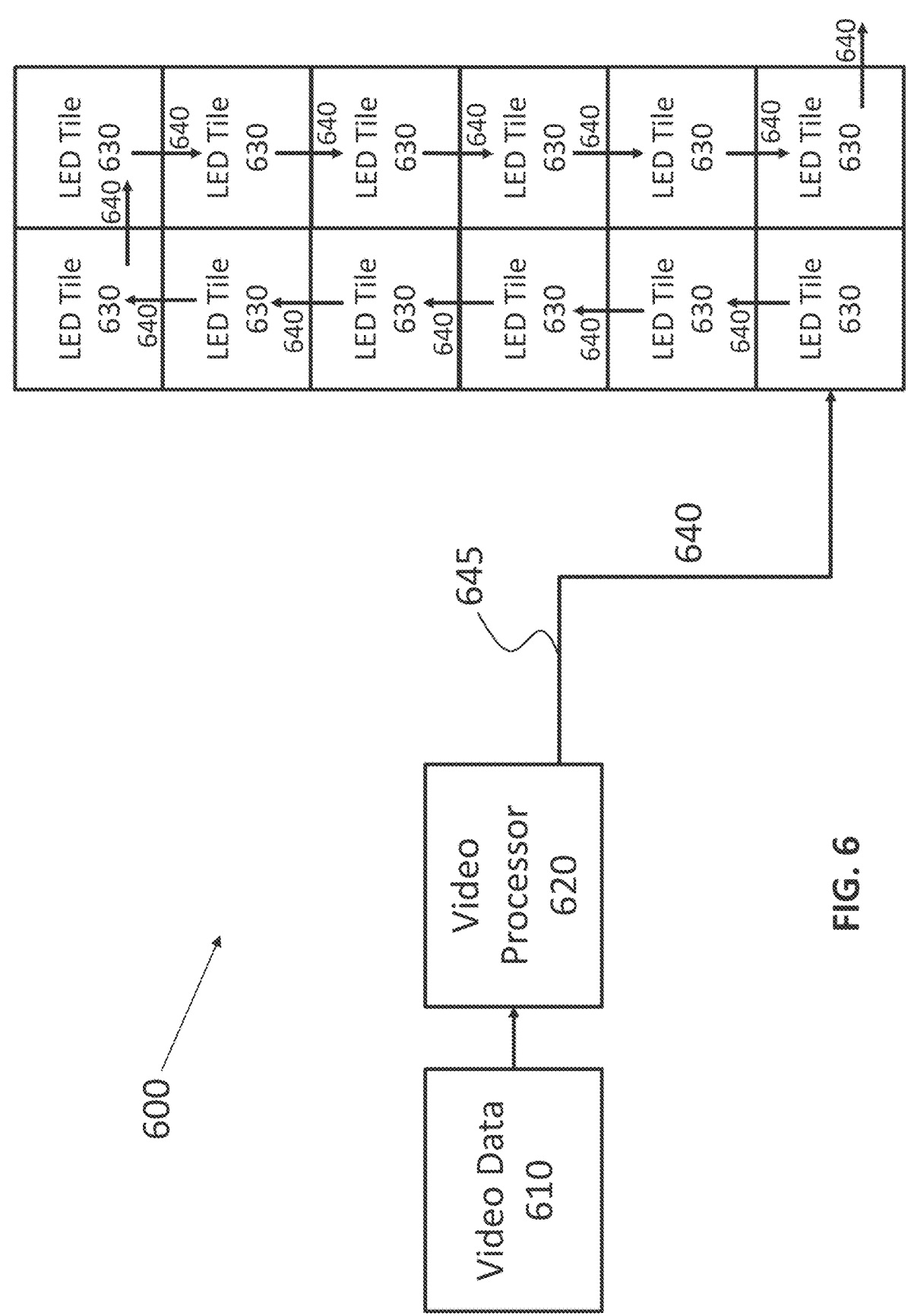
FIG. 6 illustrates an embodiment of the proposed modular display system.

FIG. 6 illustrates an embodiment of the proposed modular display system 600. The proposed system overcomes the problems of related systems 300 with much less processing needed in the processor 620 and much less latency. From a user point of view, people installing the screens and LED tiles 330 may use cheap, low bandwidth cables, such as Cat5E Ethernet cables 140. CAT5e cables, also known as Category 5e or Category 5 Enhanced, is a network cable standard ratified in 1999. CAT5e offers significantly improved performance over the old CAT5 standard, including up to 10 times faster speeds and a significantly greater ability to traverse distances without being impacted by crosstalk. CAT5e cables are typically 24-gauge twisted pair wires, which can support Gigabit networks at segment distances up to 100 m. Similarly, CAT6 cables may also be used. CAT6 is a standardized twisted pair cable for Ethernet that is backward compatible with CAT5/5e and CAT3 cable standards. Like CAT5e, CAT6 cables support Gigabit Ethernet segments up to 100 m, but they also allow for use in 10-Gigabit networks over a limited distance. Both CAT5e and CAT6 can handle speeds of up to 1000 Mbps, or a Gigabit per second.

According to a preferred embodiment, a digital high speed serial protocol is used (e.g., coax express) to transmit a video data stream 640 using a transmission line 645, for example, one or more coaxial cables. It is noted that the present disclosure is generally not limited to a specific type or cable or standard. It is noted that an HDMI connection is also a possibility, but the cable connections may be deemed not rugged or durable enough for most installations. In summary, what a (serialized) simple video protocol is used for transmitting the video data stream 640 a plurality of the LED tiles 630, and preferably to all LED tiles 630 at once, for example, as a broadcast transmission protocol, instead of using ethernet or ethernet-like protocols that needs to send individual (personalized) data to each of the individual LED tiles 630 in the LED screen. Such a broadcast serialized simple video protocol does not require addressing to one or more specific tiles or to one or more receiver cards corresponding to the one or more tiles of the display. In other words, the serialized simple video protocol for transmitting the serialized video data stream can be unaddressed. Or the serialized video stream data may be addressed or transmitted to one or more groups (plurality) of tiles collectively, which may be all or a subset of all tiles of the system (i.e., for example, multicast or anycast).

Further, the video data stream 640 may be transmitted to two or more of the individual LED tiles 630 directly, such that video data stream 640 is transmitted in parallel to at least two or more of the LED tiles, or the LED tiles 630 may be arranged to receive the video data stream 640 in a serial arrangement, as shown in FIG. 6. Or, in another embodiment, one or more of the LED tiles may be arranged to receive the video data stream in parallel and one or more of the LED tiles may be arranged to receive the video data stream in series. In contrast to current or relevant systems, more than one, some, most, or indeed, in a preferred embodiment, all LED tiles 630 in the proposed system see or receive the "full" video transmission of the full image and hence, the tile processor (traditionally called receiver card) 720 needs to extract or in other words, read out or take out from the video data stream 640 just that part of the video that pertains to that specific LED tile 630, and simply display it by outputting control signals that control pixels of the tile. In fact, this means that the complex logic is distributed all over the display instead of centralizing all the logic in an expensive processor 130. At first glance, this might seem as less cost effective. But the impact on performance is immense, as this non-centralized approach enables a performance of (many) more calculations and implementation of more complex algorithms as the pixels which need processing locally in the receiver card 720 will be less compared to the amount of pixels that are needed for full screen processing as done in related LED processing approaches. By the receiver card 720 extracting, or in other words reading out of the video data stream 640 that part that pertains to the specific LED tile corresponding to the receiver card, it should be noted that 'pertaining' does not necessarily mean that the amount of pixels extracted from the data stream is exactly the same amount as the amount of pixels that need to be controlled, or that extracted video data is necessarily received in a predetermined group or order. In a preferred case, it is true that the amount of pixels extracted from the data stream is exactly the same amount as the amount of pixels that need to be controlled. But it may be the case, in another embodiment, that, for example, the tile has an array of 12 by 12 pixels, which would in the preferred embodiment mean data related to the 144 pixels should be extracted from the stream. But suppose it may also be the case that, in another embodiment that only 10 by 10 pixels is extracted and used an interpolation scheme in the processing to really compute 144.

Although a transmission line 645 is shown in FIG. 6 as a wired line, according to another embodiment the video data stream 640 is transmitted wireless to one or more of the individual LED tiles 630. Additionally, according to a preferred embodiment, the topology of related LED tiles 330 will not be touched, or, more specifically, their hub board's 250 will not be touched so that a swap with related systems 300 and receiver cards 240 with our new "real processing cards" 720 (FIG. 7) is rather easy. Hence, a retrofit of the existing LED tile 330 fleet is also made possible without making any mechanical nor electrical changes to the hub board 250. Further on, by using a simple or simplified protocol, system (frame) latency can be reduced significantly, as described in greater detail below. In a preferred embodiment, each tile 630 of the display has one respective, corresponding receiver card 720. However, in another embodiment, two or more tiles can have (share) a receiver card that receive the video stream 640 and extracts the part of the video that pertains to each of the tiles sharing the receiver card, with the receiver card controlling each of the tiles through output control signals based on the extracted video data. Or alternatively, in another embodiment, it may be considered that one tile can have two corresponding receiver cards, such that two or more receiver cards extract data pertaining to the tile and output control signals to the tile, for example, each of the receiver cards controlling a separate portion (e.g., area) of the tile, or different pixels, or different subpixels (e.g., colors) of the tile.

Although only LED displays, with their respective LED tiles 330, 630, are mentioned above and below, the concepts of this disclosure could easily be configured to work with most or other types of displays—especially those that are configured to display images based on an array of pixels and their respective pixel data. For example, Liquid Crystal Displays (LCDs) implement an array of pixels like that of an LED display. Other examples of displays implementing an array of pixels would be resistive or capacitive touch displays such as those used in smart devices and even Cathode-Ray Tube (CRT) displays. More examples, although inherently included as LED displays, are Active Matrix Organic Light Emitting Diode (AMOLED) displays, Organic Light Emitting Diode (OLED) displays, Full-array LED displays, Mini-LED displays, Micro-LED displays, Quantum LED (QLED) displays, Quantum Dot-OLED (QD-OLED) displays, and more.

Figure 7:
FIG. 7 illustrates an embodiment of the proposed receiver card connected to an LED tile.

FIG. 7 illustrates an embodiment of the proposed receiver card 720 connected to an LED tile 630. Note that the layout, as mentioned above, of the overall LED tile 630 is similar to that of related LED tile configurations 330 (FIG. 4), however, a key difference is the proposed receiver card 720. This receiver card 720 according to this embodiment uses a similar hub board interface 450 to connect to the hub board 650 but uses interfaces 710, 730 that allow for higher bandwidth than the interfaces 420, 430 of related systems 300. These interfaces 710, 730 may be, but are not limited to, connecting with transmission line, such as one or more coaxial cables, for the transmission of the video data stream 640. By "higher bandwidth", it is noted that the ratio of the comparative bandwidth of interfaces 710, 730 with the interfaces 420, may be greater by a factor of 1.5 to 1, 2 to 1, 3 to 1, 4 to 1, 5 to 1, 10 to 1, 100 to 1, 1,000 to 1. The control signals output by the receiver card are used to control a plurality of pixels of the tile of the display, in a preferred embodiment, travel over a control board and that control board interfaces to a LED board that has drivers that generate PWM or relevant signals to light up the LEDs.

Figure 8:
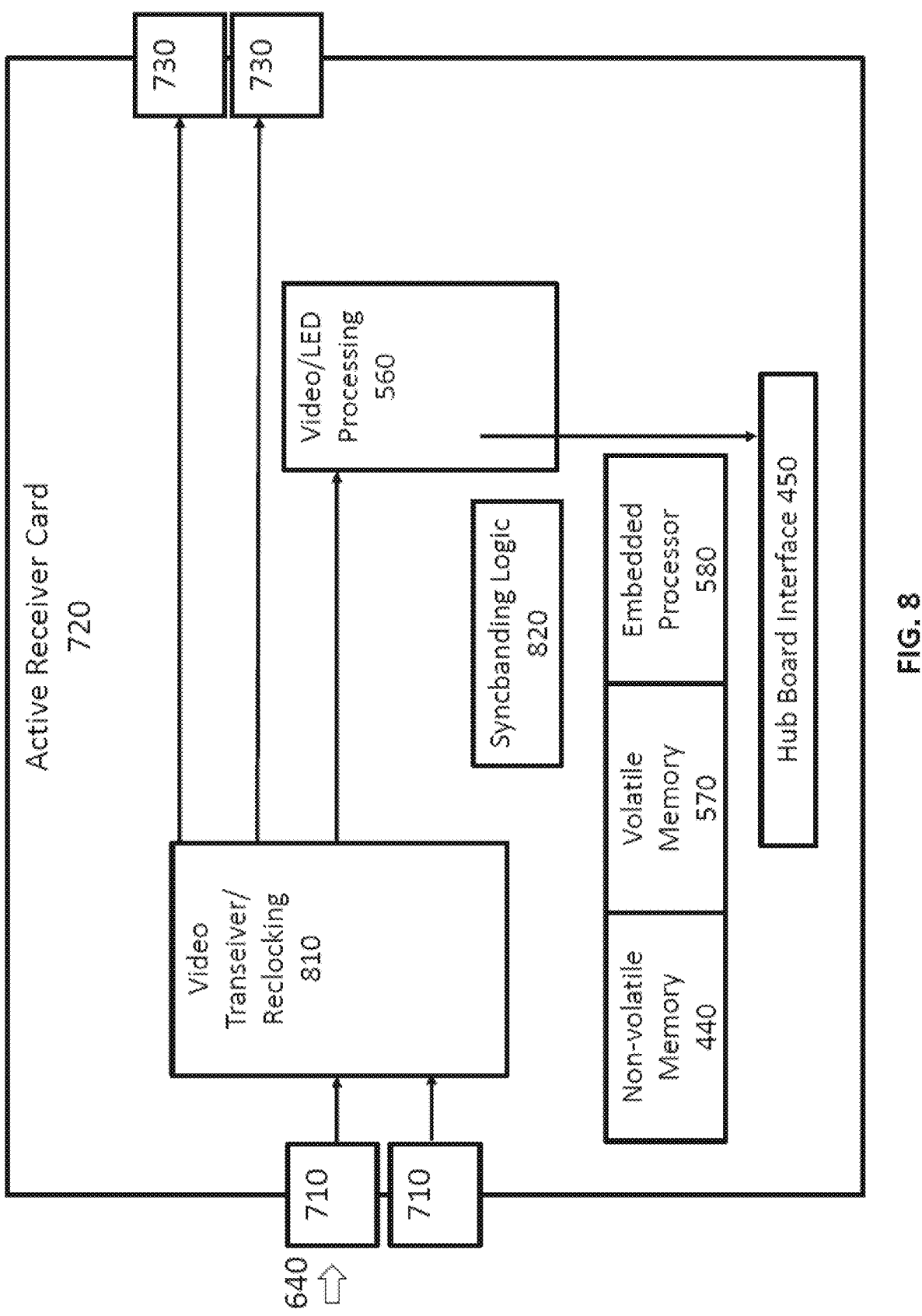
FIG. 8 illustrates the components of receiver cards of an embodiment of the proposed system.

FIG. 8 illustrates the components of receiver cards 720 of an embodiment of the proposed system 600. The incoming data 610 is seen or received first by interface 710, which passes the data 610 to the video transceiver/reclocker 810. Data needed by any specific LED tile 630 will be read from the overall data 610 and sent to the video/LED processor 570. After passing through the video/LED processor 560, the resultant data is sent to the hub board 650 via the hub board interface 450. The proposed receiver card 720 also has non-volatile memory 440, volatile memory 570, and an embedded processor 580 for performing many of the same tasks as related receiver cards 240. The receiver card 720 may further include syncbanding logic 820 capable of mitigating the effects of banding when data is captured using, for example, motion picture camera systems. Additionally, all data, including the data read by the specific LED tile 630, is allowed to pass through the receiver card 720. This step allows other LED tiles 630, and their receiver cards 720, to analyze the data 610 and read the data specific to each tile 630 respectively. This process is performed so that all the video data 610 can be seen by each LED tile 630 of a display, wherein each LED tile 630 reads only the video data 610 related to itself while all of the video data 610 to pass through to other LED tiles 630.

Redundancy

Figure 9:
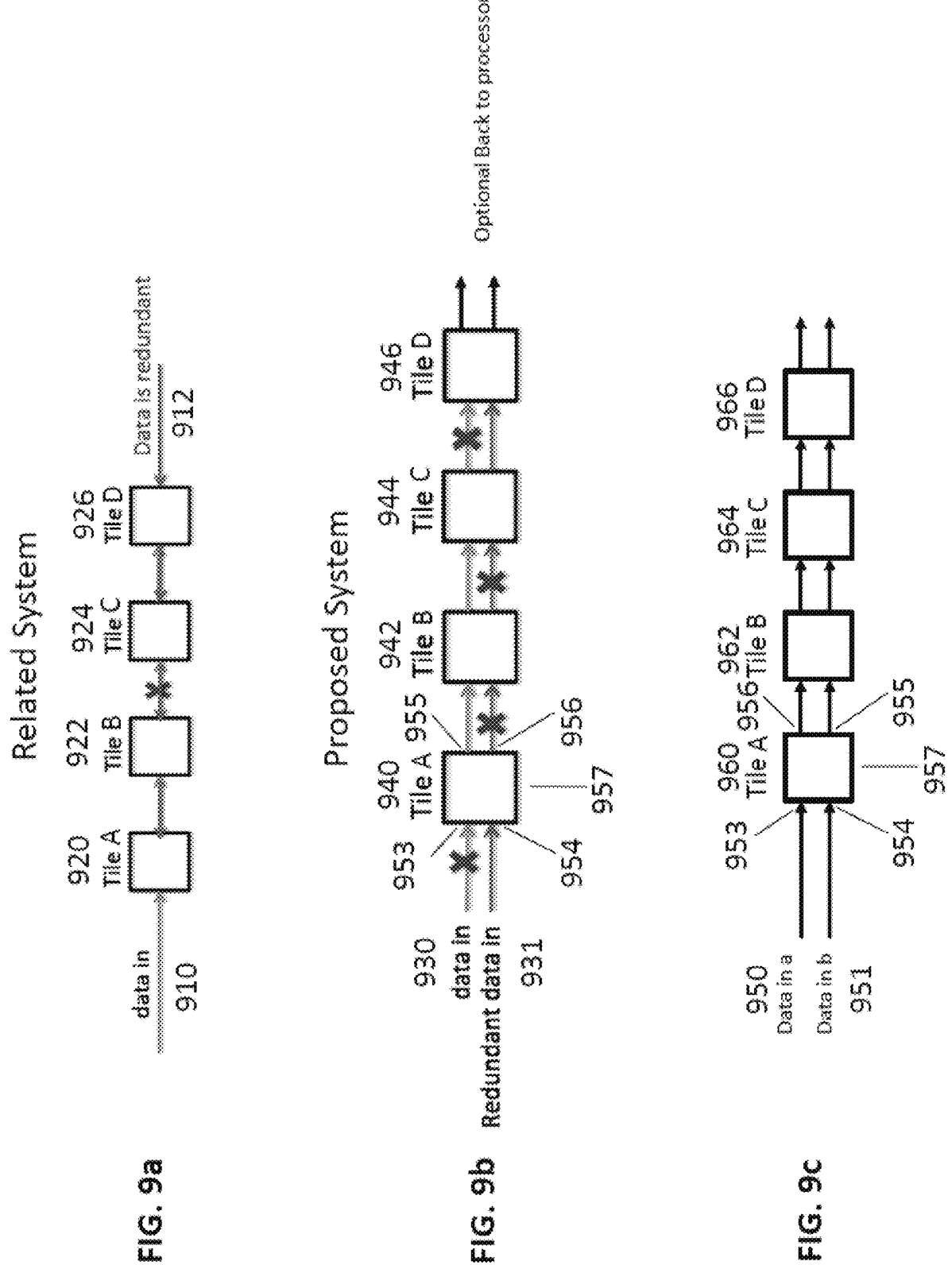
FIGS. 9a-9c illustrate the differences in the delivery of data of related systems and an embodiment of the proposed system.

FIG. 9a illustrates the redundancy between LED tiles 330 in related systems 300. In related systems, usually 2 ethernet (or ethernet-like) ports 420, 430 are being used on a receiver card 240 (see FIGS. 4 and 5). One can use the open port of a receiver card 240 (last in a chain of a branch of a tree) to also input the data needed for that particular branch of the tree. Here, four LED tiles 920, 922, 924, 926, which individually are the same LED tiles 330 described above, but are given specific names here for exemplary purposes, are shown in one such branch. If, e.g., the cable between Tile B 922 and Tile C 924 is damaged, then still Tile C 924 and Tile D 926 receive data from the redundant data ethernet link 912. However, if the cable between Tile B 922 and Tile C 924 also breaks, Tile C 924 does not see or receive any data and remains black. So, a fault tolerance of one cable is obtained.

FIG. 9b illustrates an embodiment of the proposed solution to the link break of FIG. 9a. The proposed active system described comprises at least five electrical interfaces which can use the first 953 and second 954 electrical interfaces as inputs and mirror the same data on the third 955 and fourth 956 electrical interfaces. This is the case wherein the data in 930 is exactly the same as the redundant data in 931. If one cable is broken, e.g., between the first electrical interface 953 and Tile A 940, then the tile will still show data because the redundant data in 931 interface remains viable. Tile A 940 does not see any activity on the first electrical interface 953 and will use the data from the second electrical interface 954. So, Tile A 940 will keep on showing the image. The third 955 and fourth 956 electrical interfaces will then be driven by data received from the second electrical interface, so that both output channels are active to the next tile, e.g., Tile B 942. This in fact means full redundancy as N cables may be damaged in an N tile system (but of course, not both cables may be damaged in between two consecutive tiles).

FIG. 9c illustrates a generalized embodiment implementing redundant data features. In the active LED video processing system embodied here, there are at least five electrical interfaces (the same electrical interfaces as described above for FIG. 9b). The first 953 and second 954 electrical interfaces being capable of receiving a high bandwidth linear digital serialized video data stream with downstream communication 610. The third 955 and fourth 956 electrical interfaces being capable of sending a high bandwidth linear digital serialized video data stream with downstream communication. This high bandwidth linear digital serialized video data stream may be thought of as with downstream communication, wherein data 610 is communicated downstream from a video processor 620 in a significantly higher amount than the data communicated upstream to the video processor (this is referred to as being asymmetrical), and wherein the order of the data communicated need not be communicated sequentially (linearly) as long as the data is in a predetermined and fixed order such that each LED tile 630 "knows" exactly where in the incoming data 610 that segment specific to it is (see discussion on FIG. 15). An example of high bandwidth could be a bandwidth greater than 5 Gbps but could more or less than that amount, for example, 3 Gbps, 6.2 Gbps, or 12.5 Gbps. A fifth electrical interface 957 is electronically connected directly or indirectly with a board containing one more LED tiles 330. Digital logic is provided to connect the first electrical interface 953 to the third 955 or fourth 956 electrical interface, to connect the second electrical interface to the third 955 or fourth 956 electrical interface. Moreover, digital logic is provided to change predetermined data in the serialized video data stream 610, received from the first 953 and second 954 electrical interfaces. Digital Logic may determine activity on the first 953 and second 954 electrical interfaces. Digital logic can retrieve pixel data from either or both of the first 953 and the second 954 electrical interfaces. As used herein and throughout this disclosure, "digital logic" or "a processor" are used interchangeably to refer generally to what is understood to be hardware digital logic, digital logic circuitry, control circuitry, or other circuitry or controlling circuitry, a microprocessor, or one or more processors, controllers or computing devices that operate based on received or stored instructions, such hardware being formed of one or more integrated circuits or otherwise, which may be implemented on a single metal-oxide-semiconductor integrated circuit chip or otherwise, which may include electronic components, for example, transistors, diodes, resistors, gates, relays, switches, amplifiers, inverters, buffers, and/or capacitors, etc., that are used to receive, process, perform logical operations on, and/or store signals, data, and/or information, including digital and/or analog signals, or continuous or non-continuous signals, and output one or more signals based thereon.

In an embodiment, the first 953 and second 954 electrical interfaces can be used in parallel. This means that two streams arrive 950, 951 in the active receiver card 720. If the two streams contain different video information, then the active bandwidth is doubled. Examples of this include, but are not limited to, a channel that uses odd pixels and the other channel using even pixels; or one channel can be the top of the image, the other the bottom of the image; also left/right (eye) is a possibility.

In an embodiment, one can use the first channel 950 for one video feed, the second channel 951 for another video feed (e.g., from a camera) and perform source switching in the active receiver card 720 or even show two different images superimposed onto each other or even switch images in one single frame, e.g., show another image during camera shutter opening time.

It is noted that herewith a substantial improvement over related systems and methods, for example, whereas related systems and methods, such as GhostFrame™ doubles the frequency showing two subsequent different images every frame.

Frame Delay (Latency)

Related LED processing systems 300 have inherent frame delay by design. Frame delay is defined at the time the video updates its content (at vertical sync). Each vertical sync a new image is presented over the video stream, starting with line 1 and its amount of pixels, e.g. 1920, then issuing a horizontal sync indicating a new line is presented at the video stream, again for the same length of pixels. This is repeated until all lines are shown, e.g., 1080 lines, and then subsequently issuing another vertical synchronization signal. For live and studio events it is extremely important to reduce the latency as much as possible. For example, at a live event wherein an LED screen is used, one does not want the sound of the performer to come earlier to the audience whilst the screen is still displaying images of the performer "moments/frames" earlier. This can be extremely annoying and disturbing. The same is true wherein, e.g., in a studio environment, wherein an LED screen is used for displaying special effects and background, wherein the special effects come later in time compared to the actors' movement. Frame delay is introduced due to multiple video processing methods:

Frame rate conversion

Ethernet or ethernet-like packaging transmission

Video compression techniques

Figure 10:
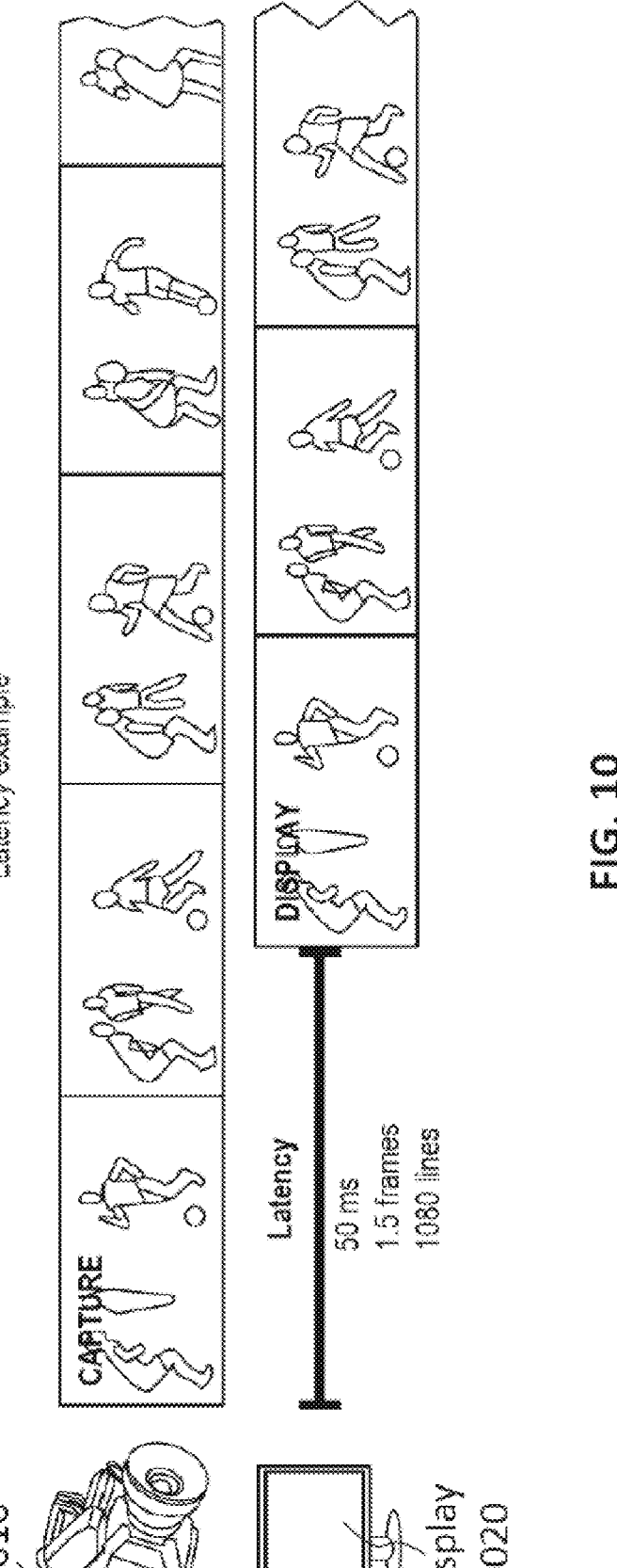
FIG. 10 illustrates the effect of latency in video processing.

FIG. 10 illustrates the effect of latency in video processing. When the camera 1010 captures an image or video, the data 310 needs to be processed, and usually is according to the related system 300 described above, in order to then be displayed. The steps of this process, with current technology, cannot be done instantaneously. Rather, the data 310 is captured and then displayed at a later time on a display 1020. In reality, a latency of 50 milliseconds between capturing an image and displaying said image is common.

Frame Rate Conversion

A related video technique is to, e.g., convert video with a frame rate of 75 Hz to 60 Hz. This means that instead of sending data 310 every 13.3 milliseconds, the video is only updated at 16.66 milliseconds. It is noted that this is some-times also used in compression techniques. Usually, the frame rate is down-converted to a standard, e.g., 60 Hz, frame rate used by related receiver cards 240. The full scope of explanation is out of the scope of this document, but it can be done in a very simple way, wherein part of the frame is repeated in the next frame, which introduces a very awful repetition of part of the frames and introducing motion artefacts in the image. Other more complex algorithms try to interpolate within the frames. This means that full frames need to be stored and out of 2 frames the motion is attempted to be estimated. This means that, with a good estimation, at least some latency is introduced (waiting for enough video frame information to derive a better new frame/motion estimation).

Ethernet (or Ethernet-Like) IP Packaging Transmission

Figure 11:
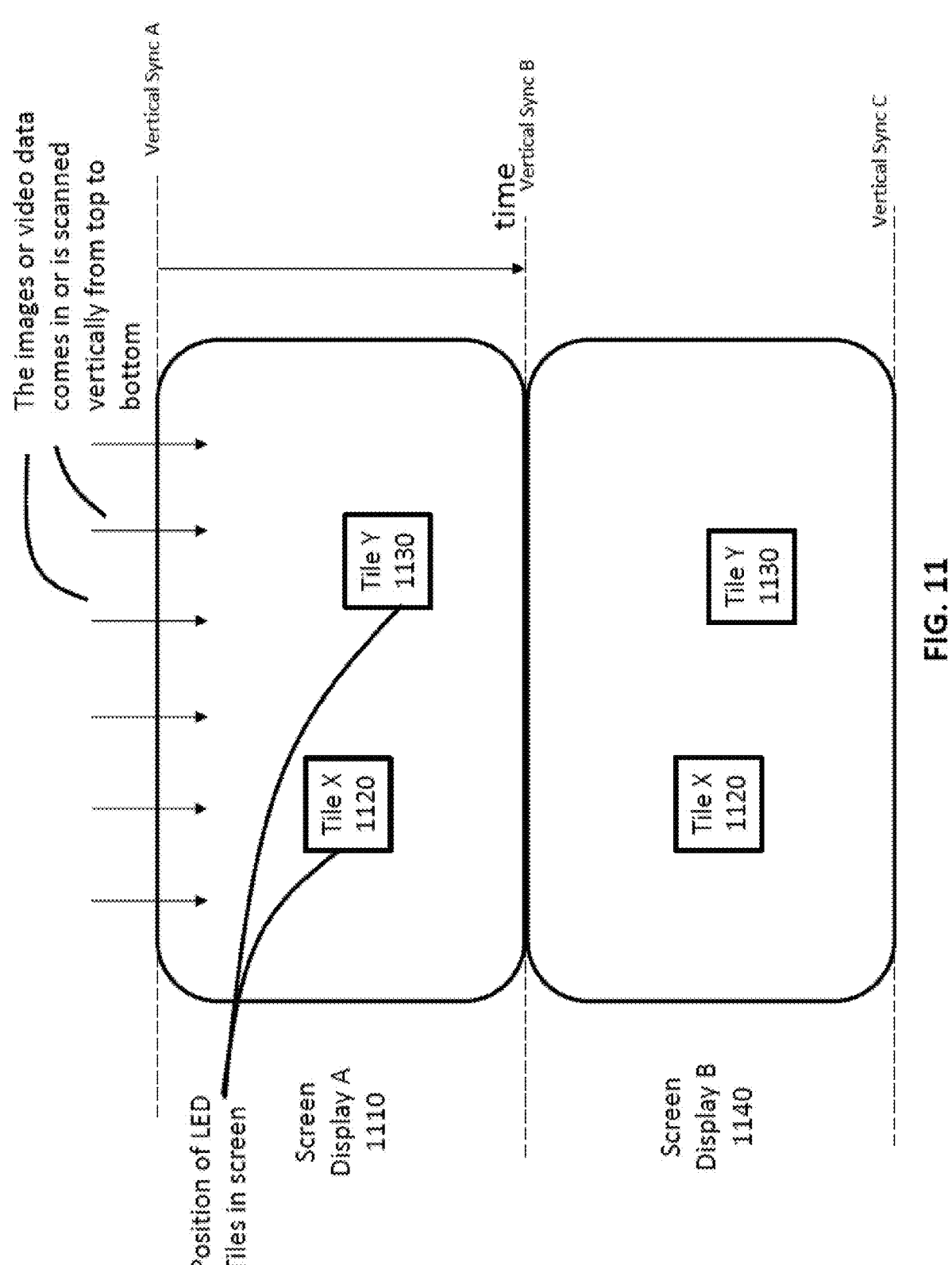
FIG. 11 illustrates a timing diagram between two vertical synchronizations of a display.

FIG. 11 illustrates a timing diagram between two vertical synchronizations of a display. Two LED tiles, Tile X 1120 and Tile Y 1130 are given as examples of two parts that make up a display. 1110 and 1140 show the same screen but between two different vertical sync cycles: between vertical sync cycles A and B (1110) and between vertical sync cycles B and C (1140), respectively.

Figure 12:
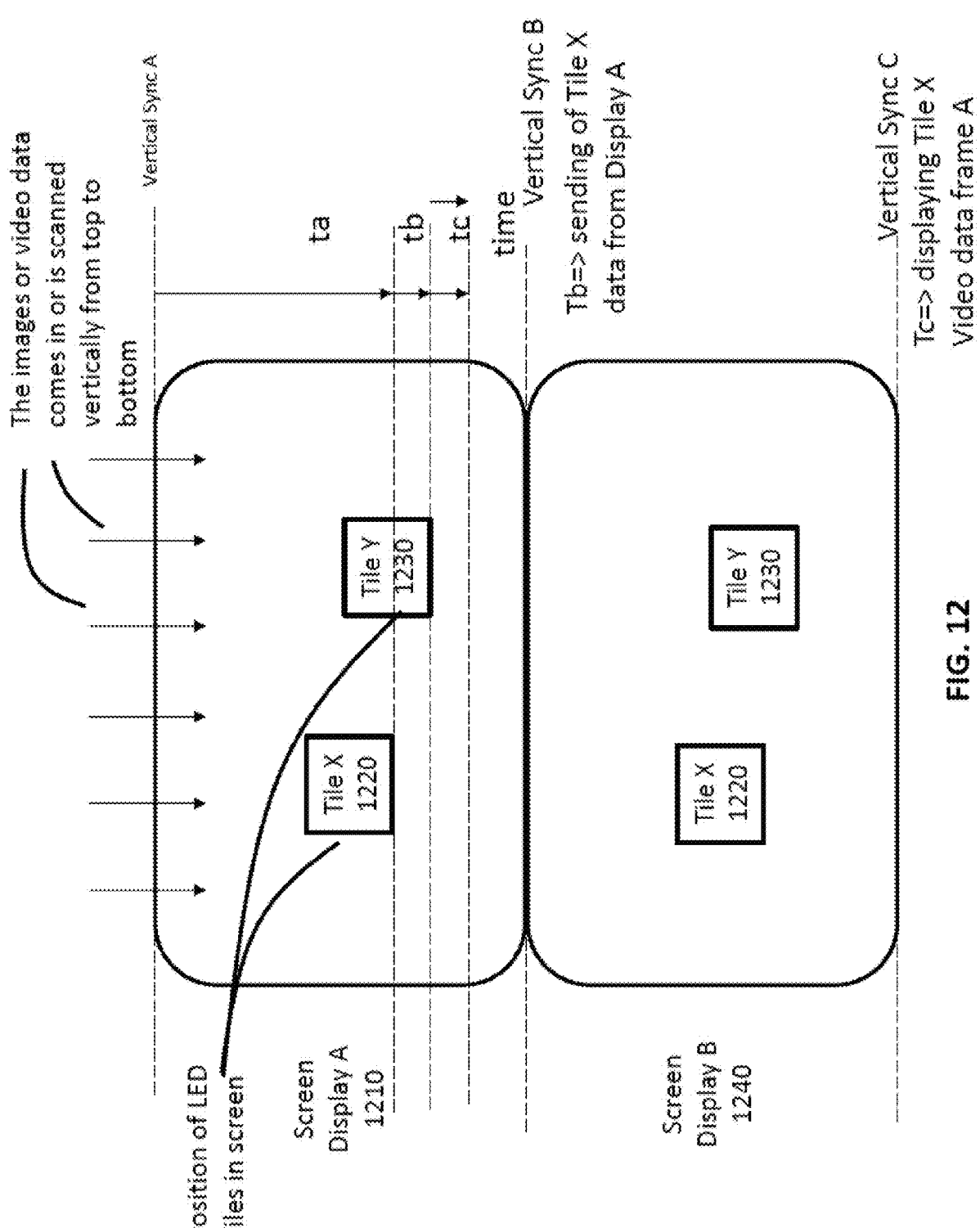
FIG. 12 illustrates the timing differences between two LED tiles during vertical synchronization cycles.
Figure 14:
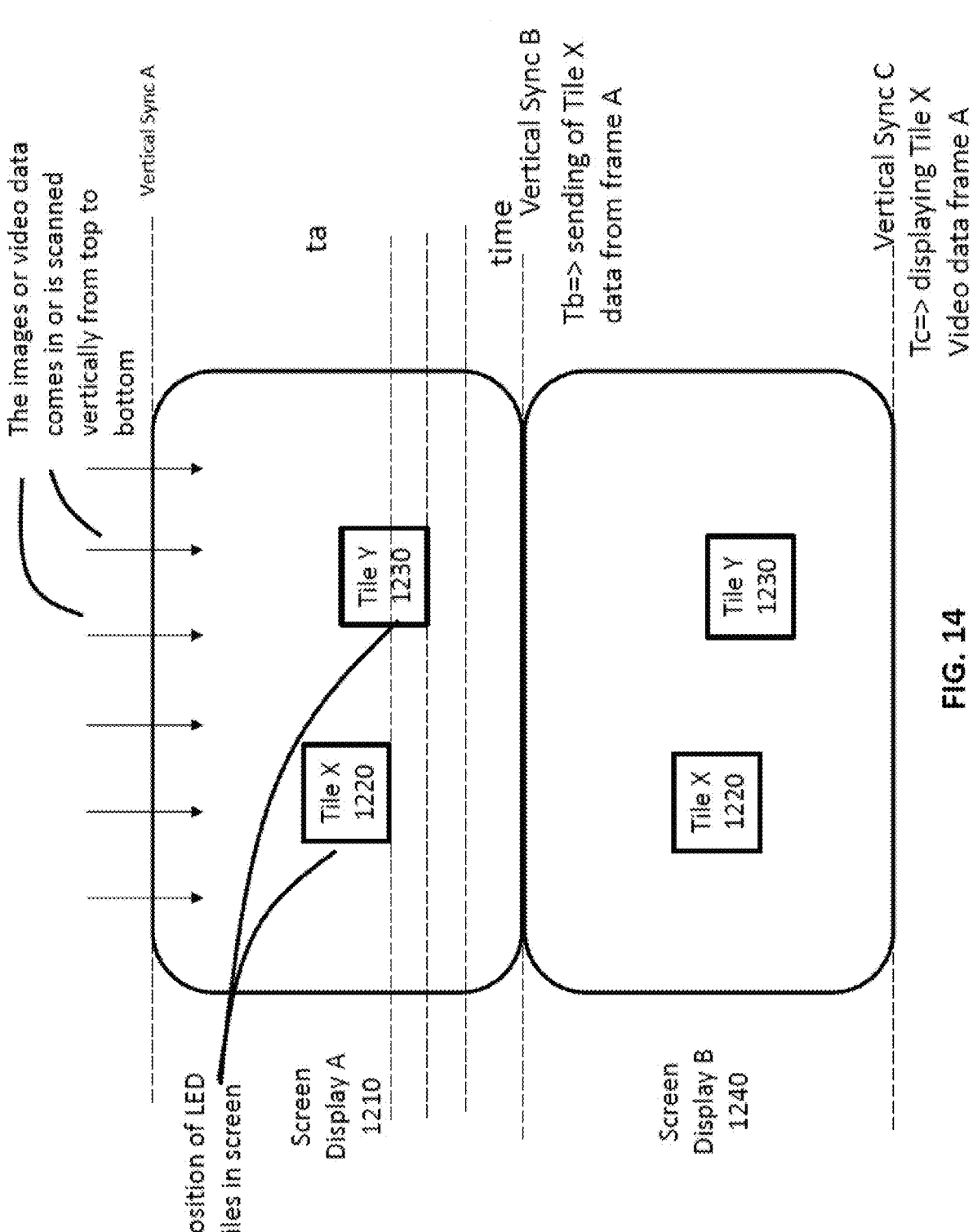
FIG. 14 illustrates the timing differences between two LED tiles during vertical synchronization cycles.

FIG. 12 illustrates the timing differences between two LED tiles 1220, 1230 during vertical synchronization cycles. 1210 and 1240 show the same screen but between two different vertical sync cycles: between vertical sync cycles A and B (1210) and between vertical sync cycles B and C (1240), respectively. Here, Tile X 1220 and Tile Y 1230 need to receive video data 310 according to their respective position on the Screen Display 1210. Before anything can happen, one needs to wait a time ta before all video data information 310 has been received (and stored) in the video processor 130 of related systems. After this period, the video data information 310 for that particular tile can be fully processed and packaged and made ready for ethernet or ethernet-like protocol that uses packages 1380 (in ethernet they sometimes call them "frames"). Data for Tile X 1220 can be sent during time tb during this time of sending data from Tile X 1220, the data of Tile Y 1230 cannot be sent. This can only be sent during time tc. Most systems even wait until vertical sync B to start sending all tile data during Frame A already introducing one frame of delay. Time tc represents the continuation of the vertical sync as it moves down display A 1210. Time Tb represents the time just after vertical sync B begins during which the data from Tile X 1220 is sent from display A 1210. Likewise, Tc represents the time just after vertical sync C as it moves down display B 1240.

On the receiver side (the 'receiver card' 240 part), e.g., Tile X 1220 needs to wait until all packets 1380 are received. It is further noted here that not all packets 1380 might arrive in the same order as they have been sent and, in the case of a system wherein ethernet switches and routers are used, packets 1380 can get lost or might not arrive in the same order. Hence a buffer in the receiver card 240 is used. It is only at that point that the full video data 310 meant for Tile X 1220 can be processed. But since all tile data, meaning data form Tile X 1220 and Tile Y 1230 comes in in a random order, one needs to make sure (and wait) for a certain time before they can show their content synchronously. Most related systems try to estimate the time (sync processing, using, e.g., PID estimators when a new sync packeted signal will arrive). It is only then when the respective tiles reliably can start showing the content. This, again, means introduc-tion of frame delay (because of waiting, you get delay). It is noted that this is only the simple case wherein packets 1380 do not get lost and wherein there is no ethernet congestion so that all packets 1380 arrive. The above timing schedule is depicted in FIG. 12.

FIG. 13 illustrates the standard IEEE 802.3 Ethernet Frame Format with its respective parts. At least 26 bytes are "wasted" 1310, 1320, 1330, 1340, 1350, 1370 containing no video information 1360. These 26 bytes comprise the fol-lowing: the preamble 1310 (7 bytes); the start frame delim-iter 1320 (1 byte); the ethernet header 1390 (14 bytes), which itself comprises the destination address 1330 (6 bytes), the source address 1340 (6 bytes), and the length indicator 1350 (2 bytes); and the frame check sequence 1370 (CRC) (4 bytes). The video data 310 itself can be of varying byte lengths, for example, between 46 and 1500 bytes.

Further Drawbacks of Using an Ethernet (or Ethernet-Like) Video System Topology

As one can see in FIG. 13, ethernet packets 1380 contain a source address 1340 and destination address 1330. In most cases these addresses are MAC (Media access control address) addresses. For detailed information, this can also be found here: en.wikipedia.org, which is herein incorporated by reference as available as of Dec. 18, 2022. Apart from the overhead, using this system also has a significant drawback. The processor must know at first which MAC addresses are in the network (i.e., how many LED tiles 330 there are and what address they have). It also needs to remember their position in the image. Retrieving its position can be done by querying the LED tile 330 for its position or retrieve it from a non-volatile storage locally in the processor 130 system. It is only after this sequence that the processor can start sending ethernet packets 1380 to this particular LED tile 330. The packets 1380 are then derived from the position in the video image and composed/computed locally in the processor 130. Most existing systems do not store the position of the LED tile 330 in local non-volatile memory of the tile 330. In fact, most systems consider the LED tiles 330 (and its receiver cards 240) as dumb devices that just need to execute on receipt of the data packets 1380 to show the video. All is centralized in the expensive video processor 130. Hence, if a processor fails, and a replacement processor must be fully reconfigured to having all settings exactly the same as the failed processor, e.g., it needs to know what to send where, how many tiles are there etc., before an image can be displayed.

Also, the topology is ethernet based, meaning that there is no way of determining an LED tile's 330 position in the ethernet tree (FIG. 3). One can only find out that there are a particular amount of tiles over the full network. One needs to manually position (using a user interface) all LED tiles 330 at the correct position on the video canvas.

Active Receiver Cards Versus Passive Receiver Cards

As seen earlier in the text, existing commercially avail-able processing systems (FIGS. 1 and 3) have a fully centralized system around an expensive video processor 130 device that sends individual tile video data 310 to the respective LED tiles 330. The tiles act as "slave" devices wherein the data is distributed in a tree like topology. The LED tiles 330 contain a receiver card 240 that interprets this data 310. Full details can be seen in FIG. 5. Blocks 420 and 430 represent two ethernet ports. In fact, only one ethernet port may be enough, but usually a second is added to loop though the ethernet network and to have (limited) redun-dancy in the system. The receiver card 240 further contains logic to store and count the Ethernet packets 1380. Once all packets 1380 are received, when using decompression, the video is decompressed. Subsequently, this data is then used by the video/LED processor 560. These cards 240 usually have volatile memory 570 to store the ethernet data packets 1380 containing video data 310. Further, there is also non-volatile memory 440 to store at least the MAC address (i.e., unique address of the receiver card 240, serial number, and perhaps some other settings). Also, in most cases an embedded processor 580 is used to control the internal settings and respond to communication packets sent by the processor 130. As one can see, there's a lot of overhead before the video can even be processed. This usually encompasses gamma correction and generates data for the constant current drivers which reside on the LED tiles 330. This data is "transported" over the hub board interface 450 (to an LED module 220 via the Hub board 250). In some cases, the non-volatile memory 440 also contains correction data and/ or calibration data for the LEDs used. This memory can also reside on the LDMs 220. This data is not always computed locally but sent by the processor 130. This is called calibration data which is derived from measurement data.

In comparison to the above, an active receiver card 720 is provided. Herein, "active" means that the receiver card 720 performs an active computation and the actively takes out (or in other words, extracts or reads out) that part of the video data stream it needs to display. And as a further example, the receiver card does not—or does not necessarily have to—wait for packets 1380, but actively gets in the full video data stream received on either/both interfaces 710, 730 (FIGS. 7 and 8) (between processor 620 and LED tile/ module 330, 220) on which it actively performs tasks which are described later. These interfaces see the full or approximately the full high bandwidth digital serialized video data stream 610. In other words, every active receiver card 720 hooked up to the video processor 620 sees the full video image. Due to its active nature, the active receiver card 720 system takes out that part of the video it needs to display. This position depends on the physical location of the particular LED tile 330 in the screen and image and is also dependent on the number of pixels (horizontal, vertical, or shaped) it has. These parameters are locally stored in the non-volatile memory 440 residing also on the active receiver card 720. Further, these parameters only change when the system (processor 620) is instructed by the user to be changed.

Figure 15:
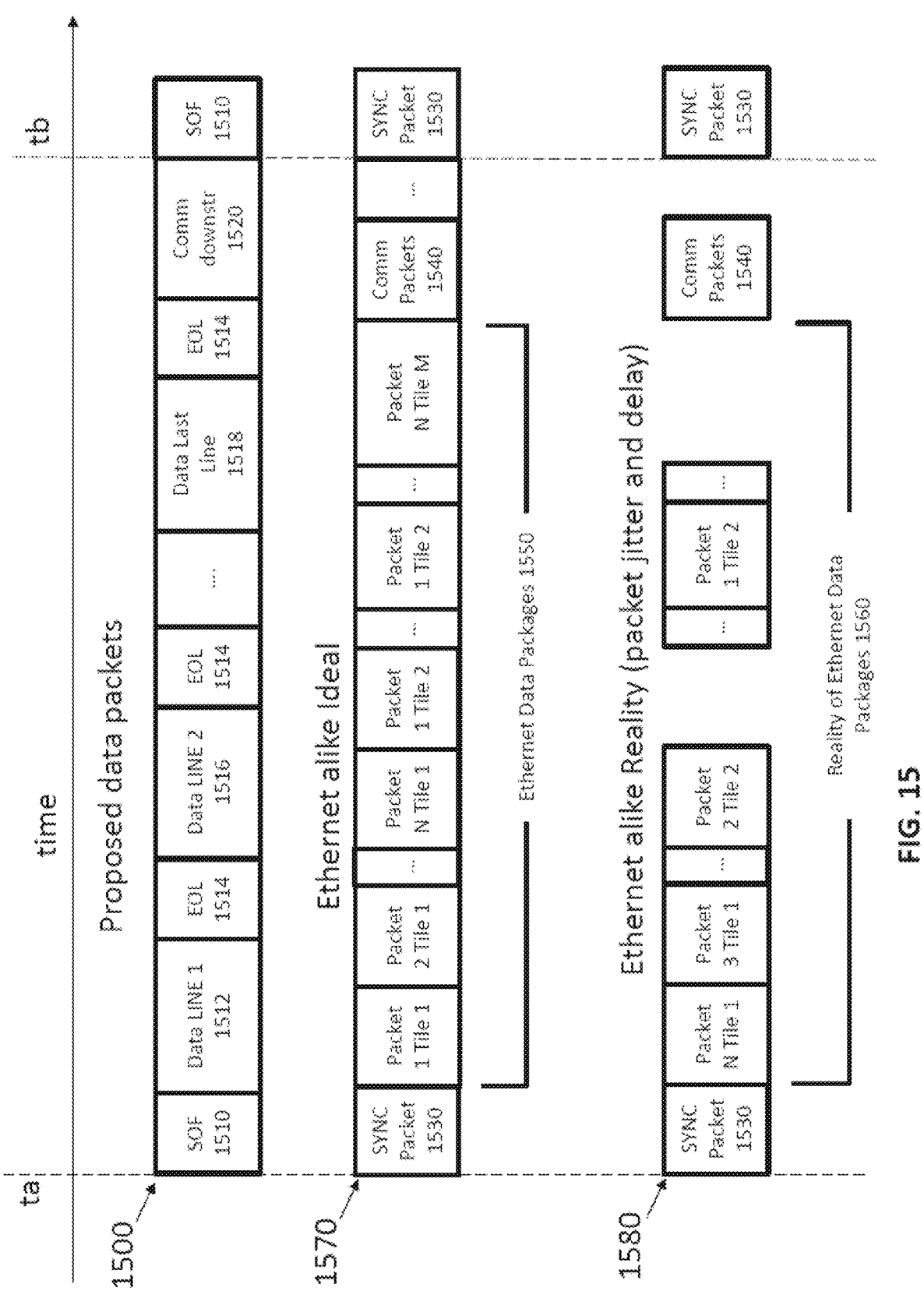
FIG. 15 illustrates a proposed data package format (1500). It further illustrates an ideal ethernet (1570 and 1580) or ethernet-like data package format and a realistic ethernet or ethernet-like data package format.

FIG. 15 illustrates a proposed data package format 1500. It further illustrates an ideal ethernet or ethernet-like data package format 1570 and a realistic ethernet or ethernet-like data package format 1580. Note that each packet as seen in both the ideal 1570 and realistic 1580 ethernet or ethernet-like data package formats contain the information from FIG. 13. These individual packets 1550 are sent consecutively, but in reality, the order of in which these packets 1560 arrive is often not as they were sent; hence, a buffer is used to hold the data before reordering all the packets properly and commencing a vertical sync cycle. Both the ideal 1550 and the realistic 1560 ethernet or ethernet-like data package formats contain SYNC packets 1530 and Comm packets 1540. The data package format 1500 for the digital serialized video data stream 610 has communication slots embedded within it, e.g., Data LINE 1 1512, Data LINE 2 1516, and Data Last Line 1518. It is through these communication slots that the active receiver card 720 receives, e.g., updates on its physical position within the overall display. Because the receiver card 720 is active, it also "knows" how many pixels it has on the canvas and how they are spaced over the video canvas. By consequence, the active receiver card 720 actively takes out the representative RGB video values it needs to display according to the LED tile 330 position.

An important improvement of the proposed data packet format 1500 over related systems 300 is that the video data 610 may come in any order. The video data 610 may come linearly (i.e., the data for pixel 3 comes after the data for pixel 2 which comes after the data for pixel 1 and so forth) or, for example, the information for the last LED tile 630 in a system 600 may be in the middle of the video data steam 610, but as long as the order of the information is predetermined and fixed (i.e., all the LED tiles 630 of a system already "know" where the video data specific to themselves resides within the video data stream 610), then the tile may pick out the data specific to it from the middle of the stream and display it. This holds true for all the LED tiles regardless of (i) their own order within an LED tile array or (ii) the position of their respective data within the video data stream 610. The above is simply an example, but the information for the last LED tile 630 in a system 600 may come first, or second, or in the middle, or last—the order does not matter as long as it is predetermined and fixed.

Autoconfiguration

FIG. 16 illustrates an example of how the video data stream 610 may be implemented. Assume a command is embedded in Comm downstr 1520 that tells all active receiver cards 720 not to send any embedded Comm downstr 1520 data. This command would be communicated via Comm A 1610 to the Nth Tile 1680. This means that the Comm B 1612 data stream does not contain the Comm downstr 1520, as shown in FIG. 16. It is known that only the Nth Tile 1680 receives communication. The Nth Tile is assigned and addressed, e.g., as Tile N 1680. Tile N 1680 will remember its address and, since it has received an address already, can apply logic in such way that it does not listen anymore to an addressing command. Also, this addressing command will tell the logic to now pass through all communication "Comm B after giving address to Tile N." Hence, Tile N+1 1960 will be the only tile that will listen to an "assign address command with address N+1." It will then not listen to any address command anymore and will pass through all Comm downstr 1520 onto Comm C 1614. So, this is a way to address all tiles in a link. If there's also an upstream channel, a "reply, e.g., can be sent. Tile N 1680 sends that it was successfully addressed. If there are, e.g., N+1 tiles, the addressing command for Tile n+2 will not send an acknowledge signal as it is not in the link or data stream. Hence, the control logic can also count how many LED tiles 630 are on this particular link. It is noted that SOF here means start of Frame; EOL means end of Line. For a system containing counter logic, the two 'indicators' can be used to determine how many pixels are in one line and how many lines are in one frame.

At this point, it may be known how many tiles 630 are on the link 640 and they are all addressed.

In an ethernet tree-based system it can be determined how many tiles 330 are hooked up to the system (e.g., by having every tile 330 broadcast their MAC address), but it may not be known their position in the full link or tree. So, intrinsically related systems can never be auto-configurable (unless sensors are put on the sides of a tile 330).

According to the invention, since all tiles 330 see the video and since they can be auto-addressed, the processor does not even need to know how many tiles 330 there are on the link. It just needs to send the digital serialized video stream.

Figures 17A, 17B:
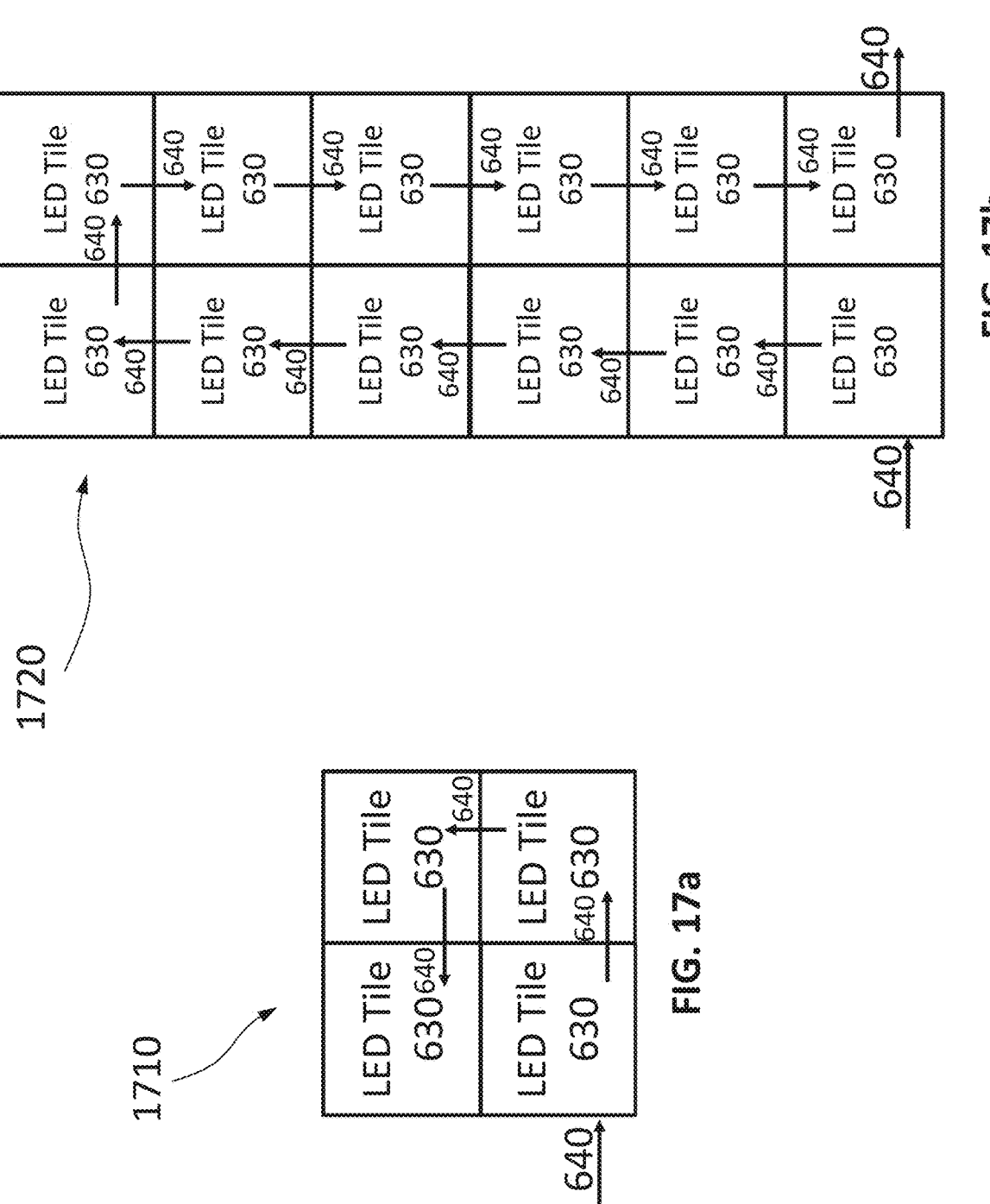
FIGS. 17a-17b illustrate two possible embodiments of the proposed video processing system.

FIGS. 17a-17b illustrate two possible embodiments of the proposed video processing system. Two simple rectangular configurations are shown. In FIG. 17a, a 2×2 configuration 1710 of LED tiles 630 is shown. And in FIG. 17b, a 2×6 configuration 1720 of LED tiles 630 is shown. For simple rectangular configurations-if we now tell the tiles 630 how the link was made and how many tiles horizontally and vertically there are, an auto-positioning system can be devised, assigning all start (x, y) configurations to the tiles 630. This logic can also reside in the active receiver cards 720 as they have a non-volatile memory 440 wherein is stored how many LEDs horizontally and vertically there are (or more complex if any non-rectangular shape is known). They know their address and they know (by, e.g., the address number) what position they are in the link and if we tell the tiles where the link starts, and how many tiles we have horizontally and vertically, then they can compute their own start (x, y) position.

It is noted that this system can change position of tiles certainly in one frame as each digital serialized video data stream has at least one communication slot between two SOFs 1510 (Start Of Frame), as for example depicted in FIG. 16. It is also noted that this Comm downstr 1520 can contain metadata, e.g., to use other brightness or to use other gamma curves as specified in HDMI 2.1 standard.

According to an embodiment, in the metadata, also (x,y,z) coordinates (or a "coordinate set") of, e.g., a camera moving arbitrarily in front of a studio screen or a user can be embedded to be sent to the tiles. Since the tiles "know" at what physical location they are, the calibration data can be changed in real-time (e.g., to correct for viewing angle). The system for real-time color and brightness correction dependent on viewing angle is already described in U.S. patent application Ser. No. 16/895,872, filed at the USPTO on Jun. 8, 2020, and U.S. patent application Ser. No. 17/865,096, filed at the USPTO on Jul. 14, 2022, which claims the benefit of priority to U.S. Provisional Patent Application 63/221, 822, which was filed at the USPTO on Jul. 14, 2021, the contents of each of which are incorporated herein by reference.

Because the active receiver cards 720 have a non-volatile memory 440, all tiles 630 can remember their settings at start-up. There is local intelligence whereas the individual settings of the tiles 630 are locally stored within each tile 630. As a result, switching video processors 620 is rather easy (as opposed to related systems) as long as a processor sends the video data stream and subsequently the active receiver cards 720 just take out that part of the video it needs to display linked with all other settings such as brightness gamma curves etc.

Figure 18:
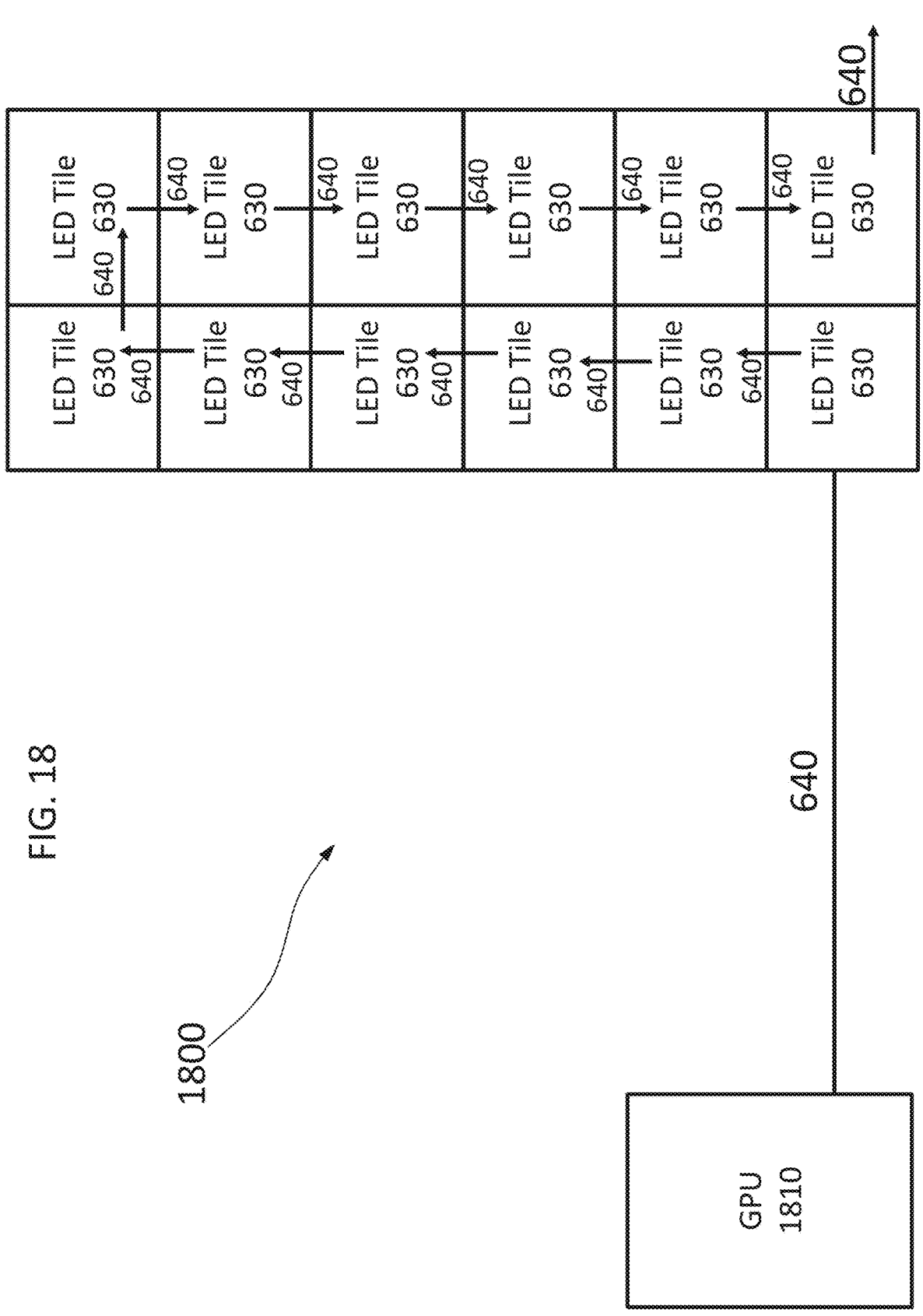
FIG. 18 illustrates a next level LED display system using a GPU to provide the video stream for the display tiles.

It is further noted, that due to the intelligence, the active receiver card 720 can also contain logic to measure time between vertical sync pulses. According to the timings received, it can optimize clocks, data, and bit depths to maximally fill the time the LEDs light up during one VSYNC period. A filter can be applied in such a way that variations in VSYNC measurements are detected (within a small margin), and consequently all relevant timings and settings are updated and calculated by the active receiver card 720. This happens after recalculation immediately.
Significant Additional Step FIG. 18 illustrates a next level LED display system 1800 based on the concepts of the present disclosure. The system as described enables even a further step wherein a "display-system" does not need to be hooked up to a screen processor 130, 620. Any system that transmits (or in other words "speaks") the right digital serialized video data stream (with or even without) downstream communication can be hooked up directly to, e.g., a computer or laptop wherein the graphical engine/card 1810 of that computer is hooked up to the display. The logic for configuration (setup) can also reside in the active receiver cards 720. Alternatively, this logic can be added into the graphical engine 1810 with a user interface wherein the display settings are integral part of the graphical engine settings. It is noted that HDMI and display port can also be seen as high bandwidth linear digital serialized video data streams 610 although they use multiple lanes for serializing data. The above in fact means that the modular LED tiles 630 can be treated just as one display (monitor, TV set, projector, gaming consoles, set top boxes, video switchers, etc.) without the need of any screen processor 620, 130. Some graphical cards 1810 even have multiple outputs, so they can drive multiple monitors in parallel. Now just replace the word "monitor" by modular LED screen.

In a further embodiment, some graphical computations for generating an image on a display make use of "mathematical" operations as well. The wording is best known from gaming consoles but is also gaining much traction in VR/AR applications. Mathematical functions such as clipping, rasterization, fragment shading, texturizing, texture mapping, are typically done in GPUs 1810 (Graphical processing Units). A step further is that the active receiver cards 720 can be part of this GPU 1810 functionality (the GPU is part of gaming and VR/AR engines). In FIG. 18 we added in 1810, a GPU which is an intrinsic part of a PC, Game console, set-top box etc.

Figure 19:
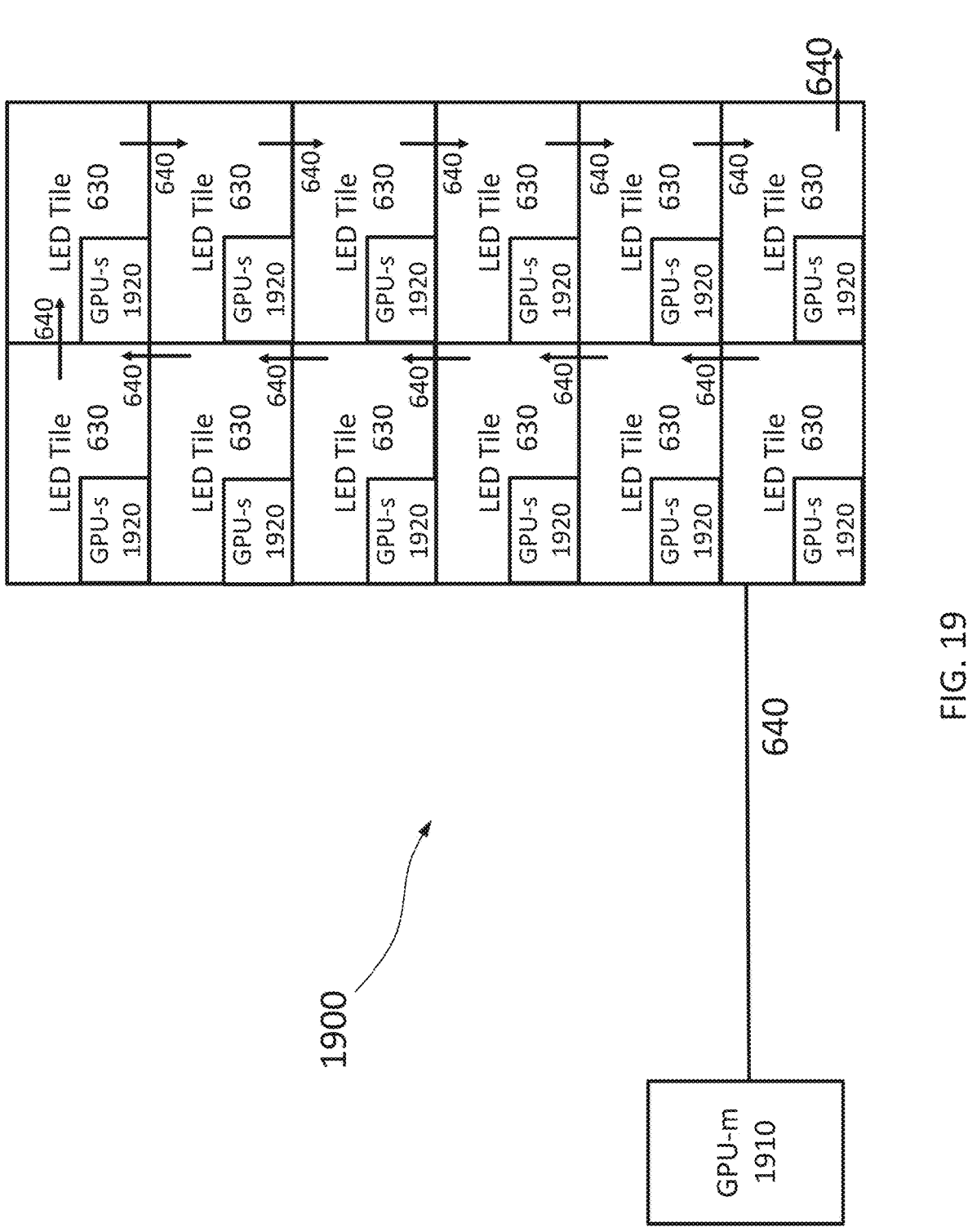
FIG. 19 illustrates a next level LED display system, wherein the graphics processing functionality is partially distributed also over the local receiver cards of the LED tiles.
Figure 20:
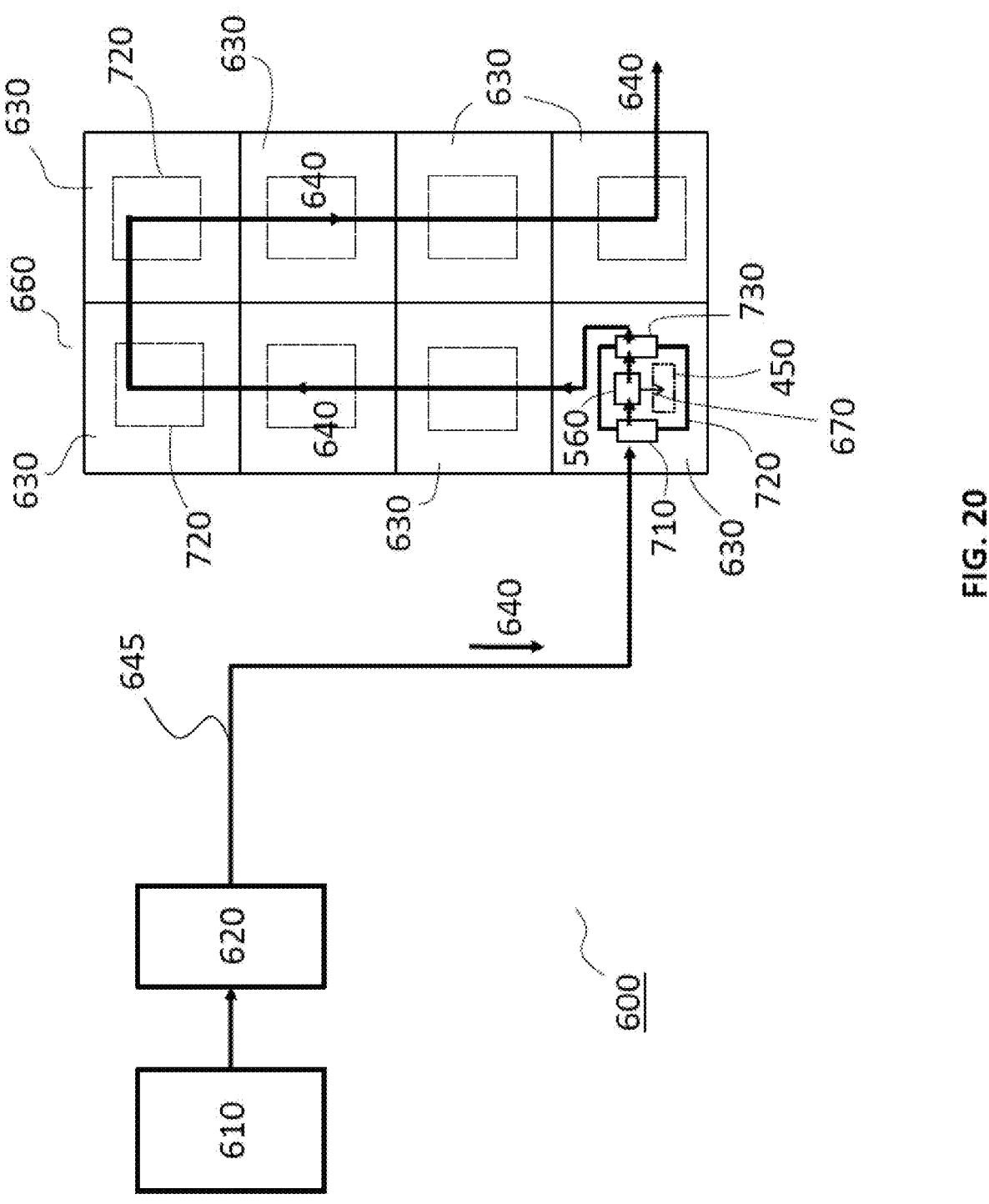

FIG. 19 illustrates a further embodiment of a next level LED display system 1900, wherein the graphics processing functionality is globalized. Since the receiver cards 720 are active, they can also include part of the GPU 1810 functionality and become part of the "Global" GPU system. The PC contains the GPU master (GPU-m) 1910 and the tiles 330 each have their own GPU slaves (GPUs) 1920. Since LED tiles 630 contain far fewer pixels, they can perform all their own processing and/or mathematical functions for pixels in parallel (e.g., clipping of GPU, e.g., shading), meaning that the "render power" of the GPU 1910 does not need to be that high or it can be kept the same, but adding extra functionality. Also, latency and performance will not be limited by the size of the canvas anymore (e.g., 1920× 1080). Some functions (as in FIG. 19) are done in parallel over 12 tiles, as is shown in this example, hence increasing performance by a factor of 12 or even reducing latency by a factor of 12.

Combinability of Embodiments and Features

This disclosure provides various examples, embodiments, and features which, unless expressly stated or which would be mutually exclusive, should be understood to be combinable with other examples, embodiments, or features described herein.

In addition to the above, further embodiments and examples include the following:

A first group of embodiments of active receiver card for a display, method, storage devices, and video processing systems are enumerated and described below.

1. An active receiver card for a display, the active receiver comprising: a processor; a first interface configured to receive a serialized video data stream as input from a video processing system, the serialized video data stream including a plurality of portions of the serialized video data stream, each of the plurality of portions of the serialized video data stream pertaining to a corresponding one of a plurality of tiles of the display, including at least a first tile and a second tile, such the plurality of portions of the serialized video data stream include at least a first portion of the serialized video data stream including video image data pertaining to the first tile of the display and a second portion of the serialized video data stream that includes video image data pertaining to the second tile of the display; wherein the active receiver card is configured to be electrically connected to the first tile of the plurality of tiles of the display; wherein the active receiver card further comprises a second interface configured to output control signals to a plurality of pixels of the first tile of the plurality of tiles of the display; wherein the active receiver card is configured to extract from the received serialized video data stream the first portion of the serialized video data stream that includes the video image data pertaining to the first tile of the display, and based thereon, the active receiver card is configured to output the control signals to the plurality of pixels of the first tile of the plurality of tiles of the display.

2. The active receiver card according to any one or a combination of one or more of 1 above and 3-12 below, wherein the active receiver card receives both the first portion of the serialized video data stream and the second portion of the serialized video data stream in a linear manner such that the first portion of the serialized video data stream is received in a periodic order before the second portion of the serialized video data stream.

3. The active receiver card according to any one or a combination of one or more of 1-2 above and 3-12 below, wherein the active receiver card is configured to receive through the first interface all of the plurality of portions of the serialized video data stream pertaining to each of plurality of tiles of the display.

4. The active receiver card according to any one or a combination of one or more of 1-3 above and 4-12 below, wherein the active receiver card is configured to receive through the first interface all of the plurality of portions of the serialized video data stream pertaining to each of plurality of tiles of the display in a predetermined order.

5. The active receiver card according to any one or a combination of one or more of 1-4 above and 6-12 below, wherein the second interface is directly or indirectly electrically connected to a board of the first tile of the plurality of tiles of the display, the board containing one or more LEDs.

6. The active receiver card according to any one or a combination of one or more of 1-5 above and 7-12 below, wherein the active receiver card is configured to operate asymmetrically with the video processing system such that the serialized video data stream transmitted downstream from the video processing system is transmitted at a higher bandwidth than a bandwidth of data transmitted upstream to the video processor.

7. The active receiver card according to any one or a combination of one or more of 1-6 above and 8-12 below, further comprising a non-volatile memory that stores at least one (x,y) coordinate of a pixel of the plurality of pixels of the first tile of the display that corresponds to one LED that is mounted on an LED board of the first tile, the at least one (x,y) coordinate corresponding to a particular (x,y) pixel coordinate.

8. The active receiver card according to any one or a combination of one or more of 1-7 above and 9-13 below, wherein the processor of the active receiver card is configured to determine a coordinate (a,b) out of the serialized video data stream, and compare the determined coordinate (a,b) to the at least one (x,y) coordinate of a pixel of the plurality of pixels.

9. The active receiver card according to any one or a combination of one or more of 1-8 above and 10-12 below, wherein the processor of the active receiver card is configured to extract a corresponding pixel value from the serialized video data stream.

10. The active receiver card according to any one or a combination of one or more of 1-9 above and 11-12 below, wherein the processor of the active receiver card is configured to perform at least one mathematical operation on the corresponding pixel value.

11. The active receiver card according to any one or a combination of one or more of 1-10 above and 12 below, wherein the processor of the active receiver card is configured to convert an outcome of the at least one mathematical operation to an output that can be interfaced with the second interface.

12. The active receiver card according to any one or a combination of one or more of 1-11 above, wherein the processor of the active receiver card is configured to send corresponding signals to a board of the first tile containing one or more LEDs, to light up the LEDs in correspondence with the outcome of the at least one mathematical operation.

13. A method for controlling with an active receiver card pixels of a display having a plurality of tiles, the active receiver card being electrically connected to a first tile of the plurality of the tiles of the display, the method comprising: receiving by a first interface of the active receiver card a serialized video data stream as input from a video processing system, the serialized video data stream including a plurality of portions of the serialized video data stream, each of the plurality of portions of the serialized video data stream pertaining to a corresponding one of a plurality of tiles of the display, including at least a first tile and a second tile, such the plurality of portions of the serialized video data stream include at least a first portion of the serialized video data stream including video image data pertaining to the first tile of the display and a second portion of the serialized video data stream that includes video image data pertaining to the second tile of the display; extracting, by a processor of the active receiver card, from the received serialized video data stream received by the first interface, the first portion of the serialized video data stream that includes the video image data pertaining to the first tile of the display; and outputting control signals, by a second interface of the active receiver card, to a plurality of pixels of the first tile of the plurality of tiles of the display.

14. The method according to any one or a combination of one or more of 13 above and 15-23 below, wherein the active receiver card receives both the first portion of the serialized video data stream and the second portion of the serialized video data stream in a linear manner such that the first portion of the serialized video data stream is received in a periodic order before the second portion of the serialized video data stream.

15. The method according to any one or a combination of one or more of 13-14 above and 16-23 below, wherein the active receiver card is configured to receive through the first interface all of the plurality of portions of the serialized video data stream pertaining to each of plurality of tiles of the display.

16. The method according to any one or a combination of one or more of 13-15 above and 17-23 below, wherein the active receiver card operates asymmetrically with the video processing system such that the serialized video data stream transmitted downstream from the video processing system is transmitted at a higher bandwidth than a bandwidth of data transmitted upstream to the video processor.

17. The method according to any one or a combination of one or more of 13-16 above and 18-23 below, further comprising storing by a non-volatile memory of the active receiver card at least one (x,y) coordinate of a pixel of the plurality of pixels of the first tile of the display that corresponds to one LED that is mounted on an LED board of the first tile, the at least one (x,y) coordinate corresponding to a particular (x,y) pixel coordinate.

18. The method according to any one or a combination of one or more of 13-17 above and 19-23 below, further comprising determining by the processor of the active receiver card a coordinate (a,b) out of the serialized video data stream, and compare the determined coordinate (a,b) to the at least one (x,y) coordinate of a pixel of the plurality of pixels.

19. The method according to any one or a combination of one or more of 13-18 above and 20-23 below, further comprising the processor of the active receiver card extracting a corresponding pixel value from the serialized video data stream.

20. The method according to any one or a combination of one or more of 13-19 above and 21-23 below, further comprising the processor of the active receiver card performing at least one mathematical operation on the corresponding pixel value.

21. The method according to any one or a combination of one or more of 13-20 above and 22-23 below, wherein the processor of the active receiver card is configured to perform at least one mathematical operation on the corresponding pixel value.

22. The method according to any one or a combination of one or more of 13-21 above and 23 below, wherein the processor of the active receiver card is configured to convert an outcome of the at least one mathematical operation to an output that can be interfaced with the second interface.

23. The method according to any one or a combination of one or more of 13-22 above, wherein the processor of the active receiver card is configured to send corresponding signals to a board of the first tile containing one or more LEDs, to light up the LEDs in correspondence with the outcome of the at least one mathematical operation.

24. A hardware storage device having stored thereon computer executable instructions which, when executed by one or more processors of a video processing system configure the one or more processors to perform the method according to any one or a combination of two or more of 13-23 above.

24. A video processing system comprising: a video processor configured to output a serialized video data stream to be displayed by a display, the video data being output by the video processor as a plurality of portions of the serialized video data stream, each of the plurality of portions of the serialized video data stream pertaining to a corresponding one of a plurality of tiles of the display, including at least a first tile and a second tile, such the plurality of portions of the serialized video data stream include at least a first portion of the serialized video data stream including video image data pertaining to the first tile of the display and a second portion of the serialized video data stream that includes video image data pertaining to the second tile of the display, wherein the video processor outputs both the first portion of the serialized video data stream and the second portion of the serialized video data stream combined as a single data stream to a first receiver card corresponding to the first tile of the display and to a second receiver card corresponding to the second tile of the display.

According to another embodiment, a video processing system comprises: a video processor configured to output video data to be displayed by a display as a video image, the video data being output by the video processor is a serialized digital video stream containing the full relevant display information to be displayed by a plurality of tiles of the display.

A second group of embodiments of active receiver card for a display, method, storage devices, and video processing systems are enumerated and described below.

An (LED) video processing system is configured to use an asymmetrical high bandwidth (e.g. >5 Gbps) linear digital serialized video data stream with downstream communication and upstream communication. The video processing system comprises at least one display (LED tile) that receives the above asymmetrical high bandwidth linear digital serialized video (signal) and displays a (pre-defined) part of this digital serialized video data stream wherein the individual LED light generation starts and stops after a predefined start and stop period. Asymmetrical should be understood to mean here that the downstream communication (to the tiles) bandwidth is higher and preferably significantly higher than the upstream communication (back to processor). Linear here should be understood to mean that pixel 2 always comes after pixel 1 and line 2 always comes after line 1.

In a broader sense, pixels or lines don't need to come in sequential order, but the order is fixed in a predetermined fashion, e.g. pixel n, subsequently pixel n−5, then pixel n−2 etc.

The system comprises at least one display (LED tile) that receives the above asymmetrical high bandwidth linear digital serialized video and displays a (pre-defined) part of this digital serialized video data stream wherein the individual LED light generation starts and stops after a predefined start and stop period. Sync-banding may also be included. If start=0, the display immediately updates.

The system according to any or a combination of one or more the above or below embodiments, wherein the digital serialized video data stream is made from at least 8 BIT RGB pixel data.

The system according to any or a combination of one or more the above or below embodiments, wherein the start is the vertical sync signal.

The system according to any or a combination of one or more the above or below embodiments, wherein the start is a programmable time to wait after vertical sync signal.

The system according to any or a combination of the above or below embodiments, wherein the stop is calculated by digitally measuring the time between two consecutive vertical sync signals.

The system according to any or a combination of one or more the above or below embodiments, where the stop is a fraction of the measurement performed in claim 5.

The system according to any or a combination of one or more the above or below embodiments, wherein multiple start and stop light generation is performed during one frame (=the time between 2 vertical sync signals).

The system according to any or a combination of one or more the above or below embodiments, wherein start and stop signals are derived by vertical sync signal and a measured camera shutter time.

The system according to any or a combination of one or more the above or below embodiments, wherein the digital serialized video data stream is uncompressed.

The system according to any or a combination of the above claims, wherein the digital serialized video data stream contains also serialized communication data for communication with the LED tiles.

The system according to any or a combination of one or more the above or below embodiments, wherein the display is LED based using PWM and multiplexing scheme.

The system according to any or a combination of one or more the above or below embodiments, wherein the display is LED based using active matrix.

An active loop through may also be considered and included in the systems described herein. Active meaning that the video data stream is received in the receiver card and directly sent out again with modifications to the communication.

A heartbeat pulse in the digital serialized video data stream to auto-detect may also be considered if the link is still operational.

A 'minimal' overhead may also be considered as we don't need preamble, source address, destination address length etc., such as depicted in the frame format of FIG. 13.

The communication channel could be 'repacked ethernet packages'. In fact it doesn't necessarily matter what is sent as long as processor and active receiver cards recognize commands correctly. For e.g. updating firmware or sending large amounts of data to the tiles, this doesn't necessarily need to use the dedicated communication slot. Instead of sending RGB data in the video data stream, one can just send the data as is and one tells the receiver card to 'take out and store' the data it needs (like a 'pick and go' principle). This system can then use the full downstream bandwidth.

In another group of embodiments for a receiver card, an active receiver card, for example, of an active LED video processing system, comprises at least two electrical interfaces. The first interface being capable of receiving a high bandwidth linear digital serialized video data stream. (This may be at least 24 bit RGB uncompressed with downstream communication.) The second interface is electronically connected directly or indirectly with a board containing one more LEDs.

The active receiver card may further comprise a non-volatile memory that stores at least one (x,y) coordinate of a pixel that corresponds to one LED that is mounted on the LED board. This (x,y) coordinate also corresponds to a particular (x,y) pixel coordinate (having (local) non-volatile memory or having means for reading non-volatile memory. Memory can reside locally, on hub board or on LED boards, and can derive calibration data therefrom. Once this is done, performing retargeting can be added (=calibration from calculated data instead of measured data).)

The active receiver card may include digital logic or a processor to (this can be FPGA logic or a combination of embedded controller and digital logic. In fact, an embedded controller is an embodiment of (complex) digital logic) determine (a,b) coordinates out of the high bandwidth linear digital serialized video data stream, and compare (a,b) coordinate with (x,y) coordinate.

The active receiver card may include digital logic or a processor to retrieve the corresponding pixel data from the high bandwidth linear digital serialized video data stream.

The active receiver card may include digital logic or a processor to at least perform one mathematical operation on the value retrieved (The mathematical operation can be done in the embedded controller if it is performed fast enough).

The active receiver card may include digital logic or a processor to convert the outcome of the above mathematical operation to logic that can interface with the second interface.

The active receiver card may include digital logic or a processor being capable to send corresponding signals on the board containing one or more LEDs, to light up the LED in correspondence with the outcome of the mathematical operation.

The link may be at least 24 bit RGB uncompressed.

The active receiver card may include at least three electrical interfaces, the first interface being capable of receiving a high bandwidth linear digital serialized video data stream with downstream communication, the second interface being capable of sending a high bandwidth linear digital serialized video data stream with downstream communication, and the third interface being electronically connected directly or indirectly with a board containing one or more LEDs The active receiver card may include digital logic or a processor to connect the first interface to the second interface.

The active receiver card may include digital logic or a processor to change predetermined data in the serialized video data stream, before it is presented to the second interface (which may be to perform autoconfiguration, i.e. automatically detect how many tiles are present, and how they need to be positioned). The last one may be to perform the auto configuration.

The system according to any or a combination of the above or below embodiments, wherein there are at least five electrical interfaces The system according to any or a combination of the above or below embodiments, wherein the first and second interfaces being capable of receiving a high bandwidth linear digital serialized video data stream with downstream communication.

The system according to any or a combination of the above or below embodiments where the third and fourth interfaces being capable of sending a high bandwidth linear digital serialized video data stream with downstream communication.

The system according to any or a combination of the above or below embodiments, further comprising a fifth interface that is electronically connected directly or indirectly with a board containing one more LEDs The active receiver card may include digital logic or a processor to connect the first interface to the third or fourth interface The active receiver card may include digital logic or a processor to connect the second interface to the third or fourth interface The active receiver card may include digital logic or a processor to change predetermined data in the serialized video data stream, received from first and second interface.

The active receiver card may include digital logic or a processor to determine activity on the first and second interface.

The active receiver card may include digital logic or a processor to retrieve pixel data from either or both first and second interface.

The system according to any or a combination of the above or below embodiments, wherein the mathematical operation comprises at least one of the following: Brightness correction; Gamma correction; Color correction; Subdelta correction; Calibration; Content dependent calibration; Time dependent calibration; Scaling function; and/or Rotation function.

The system according to any or a combination of the above or below embodiments, that further comprises (sync-banding logic).

The system according to any or a combination of the above or below embodiments, that further comprises digital logic or a processor to determine predefined start to light up the LEDs within one video frame.

The system according to any or a combination of the above or below embodiments, that further comprises digital logic or a processor to determine predefined end to light up the LEDs The system according to any or a combination of the above or below embodiments, that further comprises non-volatile memory to store the predefined start and predefined end and/or The system according to any or a combination of the above or below embodiments, that further comprises digital logic or a processor to read the non-volatile memory and at power up read the non-volatile memory for determine the predefined start and predefined end.

The system according to any or a combination of the above or below embodiments, wherein multiple starts and stops are being used in one image frame.

The system according to any or a combination of the above or below embodiments, wherein the data presented to the second interface is significantly different form data presented to the third interface.

The system according to any or a combination of the above or below embodiments, wherein the system also comprises: Volatile memory to at least store pixel information before or after the mathematical operation; Logic gamma correction; Logic for calibration; Logic for autodetection; Logic for reading and writing to non-volatile memory; and/or Logic for storing measurement data instead of calibration data.

The system according to any or a combination of the above or below embodiments, further adding in direct PC driven.

The system according to any or a combination of the above or below embodiments, wherein the high bandwidth linear digital serialized video data stream is generated by a laptop, pc or any other existing device that has graphical engine in it.

The system according to any or a combination of the above or below embodiments, wherein the high bandwidth linear digital serialized video data stream is generated by a laptop, pc or any other existing device that has a graphical engine incorporated. The system may be directly PC driven.

The system according to any or a combination of the above or below embodiments, wherein the high bandwidth linear digital serialized video data stream also contains upstream communication channel to individually 'talk' to LED tiles with the active receiver cards.

The system according to any or a combination of the above or below embodiments, wherein the GUI for adjusting screen settings is integrated in the existing GUI of the graphical engines of the laptop, PC, game console, etc.

The system according to any or a combination of the above or below embodiments, wherein the serialized video data is replaced by partially render data. (It could be that the serialized video date stream is not meant anymore for sending video, but for sending 'render input data'. In most cases this means that the necessary bandwidth can be reduced. E.g. one can be part of 'video data' and some 'texture data' and the intelligent card will perform the necessary functionality to complete the action for all its pixels.)

The system according to any or a combination of the above or below embodiments, wherein the mathematical operations are part of GPU system for rendering the content to be displayed on the LEE's.

A second group of embodiments of active receiver card for a display, method, storage devices, and video processing systems are enumerated and described below.

1. A video processing system comprising: a video processor configured to output video data to be displayed by a display as a video image, the video data being output by the video processor as a plurality of portions of the video data to be displayed by a corresponding plurality of tiles of the display, such that a first tile displays a first portion of the video image based on a first portion of the video data and a second tile displays a second portion of the video based on a second portion of the video data, wherein the video processor outputs both the first portion of the video data and the second portion of the video data to each of the first tile and the second tile.

2. The video processing system according to any one or a combination of two or more of 1 above and 3-10 below, wherein the video processor serially outputs both the first portion of the video data and the second portion of the video data to each of the first tile and the second tile.

3. The video processing system according to any one or a combination of two or more of 1-2 above and 4-10 below, wherein the video processor serially outputs both the first portion of the video data and the second portion of the video data to each of the first tile and the second tile in a linear manner such that the first portion of the video data is output to each of the first tile and the second tile in a periodic order before the second portion of the video data is output to each of the first tile and the second tile.

4. The video processing system according to any one or a combination of two or more of 1-3 above and 5-10 below, wherein the video processor outputs a respective portion of the video data for each of the plurality of tiles, and the video processor outputs all of the respective portions of the video data to each of the plurality of tiles.

5. The video processing system according to any one or a combination of two or more of 1-4 above and 6-10 below, wherein the video processor outputs all of the respective portions of the video data to each of the plurality of tiles in a predetermined order.

6. The video processing system according to any one or a combination of two or more of 1-5 above and 7-10 below, wherein the video processor uses an asymmetric video stream such that the video data transmitted downstream from the video processor at a higher bandwidth than a bandwidth of data transmitted upstream to the video processor.

7. The video processing system according to any one or a combination of two or more of 1-6 above and 8-10 below, wherein the video processor is configured to output the video data to be displayed by an LED display having a plurality of LED tiles.

8. The video processing system according to any one or a combination of two or more of 1-7 above and 9-10 below, further comprising a display comprising a plurality of tiles, including a first tile and a second tile.

9. The video processing system according to any one or a combination of two or more of 1-8 above and 10 below, wherein the first tile and the second tile are each configured to start and stop respectively displaying the first portion of the video image based on the first portion of the video data and the second portion of the video based on the second portion of the video data after a predefined start period and a stop period.

10. The video processing system according to any one or a combination of two or more of 1-9 above, further comprising a plurality of active receiver cards, each of the plurality of tiles having a respective one of the active receiver cards, wherein each of the plurality of active receiver cards is configured to receive each of the plurality of portions of the video data and based thereon, is configured to output signals to light individual pixels of the respective tile.

11. A video processing method comprising: outputting video data to be displayed by a display as a video image, the video data being output by a video processor as a plurality of portions of the video data to be displayed by a corresponding plurality of tiles of the display, such that a first tile displays a first portion of the video image based on a first portion of the video data and a second tile displays a second portion of the video based on a second portion of the video data, wherein outputting the video data includes outputting both the first portion of the video data and the second portion of the video data to each of the first tile and the second tile.

12. The video processing method according to any one or a combination of two or more of 11 above and 13-18 below, wherein outputting the video data includes serially outputting both the first portion of the video data and the second portion of the video data to each of the first tile and the second tile.

13. The video processing method according to any one or a combination of two or more of 11-12 above and 14-18 below, wherein outputting the video data includes serially outputting both the first portion of the video data and the second portion of the video data to each of the first tile and the second tile in a linear manner such that the first portion of the video data is output to each of the first tile and the second tile in a periodic order before the second portion of the video data is output to each of the first tile and the second tile.

14. The video processing method according to any one or a combination of two or more of 11-13 above and 15-18 below, wherein outputting the video data includes outputting a respective portion of the video data for each of the plurality of tiles, and the video processor outputs all of the respective portions of the video data to each of the plurality of tiles.

15. The video processing method according to any one or a combination of two or more of 11-14 above and 16-18 below, wherein outputting the video data includes using an asymmetric video stream such that the video data transmitted downstream from the video processor at a higher bandwidth than a bandwidth of data transmitted upstream to the video processor.

16. The video processing method according to any one or a combination of two or more of 11-15 above and 17-18 below, wherein the display is an LED display having a plurality of LED tiles.

17. The video processing method according to any one or a combination of two or more of 11-16 above and 18 below, further comprising displaying the first portion of the video image by the first tile and displaying the second portion of the video image by the second tile, wherein the first tile and the second tile each start and stop respectively displaying the first portion of the video image based on the first portion of the video data and the second portion of the video based on the second portion of the video data after a predefined start period and a stop period.

18. The video processing method according to any one or a combination of two or more of 11-17 above, further comprising receiving the plurality of portions of the video data by a plurality of active receiver cards, each of the plurality of tiles having a respective one of the active receiver cards, wherein each of the plurality of active receiver cards is configured to receive each of the plurality of portions of the video data, and the method further comprising respectively outputting, by each of the plurality of active receiver cards, output signals to light individual pixels of the respective tile.

19. A hardware storage device having stored thereon computer executable instructions which, when executed by one or more processors of a video processing system configure the one or more processors to perform the method according to any one or a combination of two or more of 11-18 above.

20. An active receiver card comprising: a processor; a first interface configured to receive input from a video processing system; and a second interface configured to output signals to a plurality of pixels of a display tile corresponding to the active receiver card, wherein the active receiver card is configured to be connected to a tile of a display comprising a plurality of tiles, wherein the active receiver card is configured to receive a plurality of portions of the video data from the video processing system, each of the plurality of portions of video data corresponding to one of the plurality of tiles of the display, and wherein the active receiver card is configured to retrieve pixel data relating to the plurality of pixels of the display tile, and based thereon, is configured to output signals to light individual pixels of the display tile.

A third group of embodiments of active receiver card for a display, method, storage devices, and video processing systems are enumerated and described below.

1. A video processing system (e.g., as shown in FIG. 6) comprising: a video processor configured to send a video data stream with downstream communication, wherein the video data is communicated downstream from the video processor in a higher amount than the data communicated upstream to the video processor, and wherein the order of the data communicated need not be communicated sequentially starting as long as the data is in a predetermined and fixed order; at least one display connected to said video processor that displays at least a part of the data from the video data stream sent either to or from said video processor; and at least one receiver card comprising: a video transceiver/reclocker configured to capture data from the video data stream that is specific to said receiver card and to allow data from the video data stream that is not specific to said receiver card to pass through said receiver card.

2. The video processing system according to any one or a combination of two or more of 1 above and 3-13 below, wherein the at least one receiver card further comprises digital logic to mitigate the effects of syncbanding.

3. The video processing system according to any one or a combination of two or more 1-2 above and 4-13 below, wherein the video data stream sent by said video processor is made from at least 8-bit RGB pixel data.

4. The video processing system according to any one or a combination of two or more 1-3 above and 5-13 below, wherein individual pixel light generation starts and stops after a predefined start and stop period, and wherein at the beginning of said start period said at least one display immediately updates.

5. The video processing system according to any one or a combination of two or more 1-4 above and 6-13 below, wherein the start of said start and stop period is based on a vertical sync signal.

6. The video processing system according to any one or a combination of two or more 1-5 above and 7-13 below, wherein the start of said start and stop period is based on a programmable time to wait after a vertical sync signal.

7. The video processing system according to any one or a combination of two or more 1-6 above and 8-13 below, wherein the stop of said start and stop period is based on a calculation that digitally measures the time between two consecutive vertical sync signals.

8. The video processing system according to any one or a combination of two or more 1-7 above and 9-13 below, wherein the stop of said start and stop period is a fraction of the measurement of time between two consecutive vertical sync signals.

9. The video processing system according to any one or a combination of two or more 1-8 above and 10-13 below, wherein multiple pixel light generations start and stop during the time between two vertical sync signals.

10. The video processing system according to any one or a combination of two or more 1-9 above and 11-13 below, wherein the start and the stop of said start and stop period are derived from a vertical sync signal and a measured camera shutter time.

11. The video processing system according to any one or a combination of two or more 1-10 above and 12-13 below, wherein the data communicated along said video data stream is uncompressed.

12. The video processing system according to any one or a combination of two or more 1-11 above and 13 below, wherein the video data steam sent by said processor contains serialized communication data for communication with said at least one display.

13. The video processing system according to any one or a combination of two or more 21-32 above, wherein the display is LED based, and wherein the display uses Pulse Width Modulation (PWM), multiplexing, or active matrix schemes.

14. A method of video processing, said method comprising the steps of: providing an asymmetrical high bandwidth linear digital serialized video data stream to at least one display; generating a start condition, which determines when to start individual pixel light generation; generating a stop condition, which determines when to stop individual pixel light generation; and updating the display when the start condition is met.

15. The method according to any one or a combination of two or more 14 above and 16-19, further comprising the step of retrieving pixel data from the high bandwidth linear digital serialized video data stream.

16. The method according to any one or a combination of two or more 14-15 above and 17-19, further comprising the step of performing at least one mathematical operation on the retrieved pixel data.

17. The method according to any one or a combination of two or more 14-16 above and 18-19 below, further comprising the step of correcting at least one of the settings selected from the group consisting of brightness, gamma, color, and subdelta.

18. The method according to any one or a combination of two or more 14-17 above and 19 below, further comprising the step of providing a downstream communication channel to individually communicate with pixels on the at least one display.

19. The method according to any one or a combination of two or more 34-38 above, further comprising the step of providing an upstream communication channel to individually communicate with pixels on the at least one display.

20. A hardware storage device having stored thereon computer executable instructions which, when executed by one or more processors of a computer system of a video processing system comprising an asymmetrical high bandwidth linear digital serialized video data stream and at least one display, configure the video processing system to perform the following for providing video data to the at least one display: retrieve corresponding pixel data for the at least one display from the high bandwidth linear digital serialized video data stream; perform at least one mathematical operation on the retrieved pixel data; and convert the outcome of the above mathematical operation to logic that can interface with the video processing system;

21. The hardware storage device of 20 above, further configuring the video processing system to perform the following for providing video data to the at least one display: determine a start condition to light up at least one pixel of the at least one display; and determine a stop condition to light up at least one pixel of the at least one display.

22. An video processing system comprising: at least a first electrical interface and a second electrical interface, wherein the first electrical interface is capable of receiving a video data stream with downstream communication, wherein the order of the data communicated along the video data stream need not be communicated sequentially as long as the data is in a predetermined and fixed order, and wherein the second electrical interface is electronically connected directly or indirectly with a board containing one or more LEDs; a receiver card, wherein the receiver card does not wait for data packets but actively receives the full data stream received on either or both the first and the second electrical interface; non-volatile memory that stores at least a first coordinate set of a pixel that corresponds to one LED, wherein said first coordinate set also corresponds to a particular pixel coordinate; digital logic to: determine a second coordinate set out of the data communicated along the video data stream; and compare the first coordinate set with the second coordinate set; digital logic to retrieve the corresponding pixel data from the data communicated along the video data stream; digital logic to perform at least one mathematical operation on the value retrieved from the data communicated along the video data stream; and digital logic to convert the outcome of said at least one mathematical operation to logic that can interface with the second electrical interface, wherein all the above digital logic is capable of sending corresponding signals on said board containing one or more LEDs to light up at least one of the LEDs in correspondence with the outcome of the mathematical operation.

23. The video processing system according to any one or a combination of two or more 22 above and 24-35 below, wherein there are at least three electrical interfaces, wherein the first electrical interface is capable of receiving the data communicated along the video data stream with downstream communication, and wherein the second electrical interface is capable of sending the data communicated along the video data stream with downstream communication, and wherein the third electrical interface is electronically connected directly or indirectly with a board containing or more LEDs, and further comprising: digital logic that connects the first electrical interface to the second electrical interface; and digital logic that changes predetermined data in the video data stream before it is presented to the second electrical interface.

24. The video processing system according to any one or a combination of two or more 22-23 above and 25-35 below, wherein the data presented to the second electrical interface is different from data presented to the third electrical interface.

25. The video processing system according to any one or a combination of two or more 22-24 above and 26-35 below, wherein there are at least five electrical interfaces, wherein the first and second electrical interfaces are capable of receiving the data communicated along the video data stream with downstream communication, and wherein the third and fourth electrical interfaces are capable of sending the data communicated along the video data stream with downstream communication, and wherein the fifth electrical interface is electronically connected directly or indirectly with a board containing one or more LEDs, and further comprising: digital logic to connect the first electrical interface to the third or fourth electrical interface; digital logic to connect the second electrical interface to the third or fourth electrical interface; digital logic that changes predetermined data in the video data stream received from the first and second electrical interfaces; digital logic to determine activity on the first and second electrical interfaces; and digital logic to retrieve pixel data from either or both of the first and the second electrical interfaces.

26. The video processing system according to any one or a combination of two or more 22-25 above and 27-35 below, wherein the mathematical operation comprises at least one of the following: brightness correction; gamma correction; color correction; subdelta correction; calibration; content dependent calibration; time dependent calibration; a scaling function; and/or a rotation function.

27. The video processing system according to any one or a combination of two or more 22-26 above and 28-35 below, further comprising: digital logic to determine a predefined start to light up the LEDs within one video frame; digital logic to determine a predefined stop to light up the LEDs; non-volatile memory to store the predefined start and the predefined stop; and digital logic to read the non-volatile memory and at power-up read the non-volatile memory to determine the predefined start and the predefined stop.

28. The video processing system according to any one or a combination of two or more 22-27 above and 29-35 below, wherein multiple starts and multiple stops are used in one image frame.

29. The video processing system according to any one or a combination of two or more 22-48 above and 30-35 below, further comprising: volatile memory to, at the least, store pixel information before or after the mathematical operation; digital logic for gamma correction; digital logic for calibration; digital logic for autodetection; digital logic for reading and writing to non-volatile memory; and/or digital logic for storing measurement data instead of calibration data.

30. The video processing system according to any one or a combination of two or more 22-29 above and 31-35 below, wherein the video data stream is generated by a laptop, personal computer, or any other existing device that has a graphical engine incorporated therein.

31. The video processing system according to any one or a combination of two or more 22-30 above and 32-35 below, wherein the Graphical User Interface (GUI) for adjusting display settings is integrated into the existing GUI of devices that have graphical engines incorporated therein.

32. The video processing system according to any one or a combination of two or more 22-31 above and 33-35 below, wherein the video data stream further comprises: an upstream communication channel to individually communicate to the board containing one or more LEDs with at least one active receiver card.

33. The video processing system according to any one or a combination of two or more 22-32 above and 34-35 below, wherein the data communicated along the video data stream is replaced by partially rendered data.

34. The video processing system according to any one or a combination of two or more 22-33 above and 35 below, wherein the mathematical operations are part of a Graphics Processing Unit (GPU) system for rendering the content to be display on the board containing one or more LEDs.

35. The video processing system according to any one or a combination of two or more 22-34 above, wherein the coordinate set comprises three-dimensional coordinate information.

A fourth group of embodiments of active receiver card for a display, method, storage devices, and video processing systems are enumerated and described below 1. An active receiver card for a display, the active receiver comprising: a processor; a first interface configured to receive a broadcast serialized video data stream as input from a video processing system, the broadcast serialized video data stream including a plurality of portions of the serialized video data stream, each of the plurality of portions of the serialized video data stream pertaining to a corresponding one of a plurality of tiles of the display, including at least a first tile and a second tile, such the plurality of portions of the serialized video data stream include at least a first portion of the serialized video data stream including video image data pertaining to the first tile of the display and a second portion of the serialized video data stream that includes video image data pertaining to the second tile of the display; wherein the active receiver card is configured to be electrically connected to the first tile of the plurality of tiles of the display; wherein the active receiver card further comprises a second interface configured to output control signals to a plurality of pixels of the first tile of the plurality of tiles of the display; wherein the active receiver card is configured to extract from the received serialized video data stream the first portion of the serialized video data stream that includes the video image data pertaining to the first tile of the display, and based thereon, the active receiver card is configured to output the control signals to the plurality of pixels of the first tile of the plurality of tiles of the display.

2. The active receiver card according to any one or a combination of two or more of 1 above and 3-12 below, wherein the active receiver card receives both the first portion of the broadcast serialized video data stream and the second portion of the serialized video data stream in a linear manner such that the first portion of the serialized video data stream is received in a periodic order before the second portion of the serialized video data stream.

3. The active receiver card according to any one or a combination of two or more of 1-2 above and 4-12 below, wherein the active receiver card is configured to receive through the first interface all of the plurality of portions of the broadcast serialized video data stream pertaining to each of plurality of tiles of the display.

4. The active receiver card according to any one or a combination of two or more of 1-3 above and 5-12 below, wherein the active receiver card is configured to receive through the first interface all of the plurality of portions of the broadcast serialized video data stream pertaining to each of plurality of tiles of the display in a predetermined order.

5. The active receiver card according to any one or a combination of two or more of 1-4 above and 6-12 below, wherein the second interface is directly or indirectly electrically connected to a board of the first tile of the plurality of tiles of the display, the board containing one or more LEDs.

6. The active receiver card according to any one or a combination of two or more of 1-5 above and 7-12 below, wherein the active receiver card is configured to operate asymmetrically with the video processing system such that the broadcast serialized video data stream transmitted downstream from the video processing system is transmitted at a higher bandwidth than a bandwidth of data transmitted upstream to the video processor.

7. The active receiver card according to any one or a combination of two or more of 1-6 above and 8-12 below, further comprising a non-volatile memory that stores at least one (x,y) coordinate of a pixel of the plurality of pixels of the first tile of the display that corresponds to one LED that is mounted on an LED board of the first tile, the at least one (x,y) coordinate corresponding to a particular (x,y) pixel coordinate 8. The active receiver card according to any one or a combination of two or more of 1-7 above and 9-12 below, wherein the processor of the active receiver card is configured to determine a coordinate (a,b) out of the broadcast serialized video data stream, and compare the determined coordinate (a,b) to the at least one (x,y) coordinate of a pixel of the plurality of pixels.

9. The active receiver card according to any one or a combination of two or more of 1-8 above and 10-12 below, wherein the processor of the active receiver card is configured to extract a corresponding pixel value from the broadcast serialized video data stream.

10. The active receiver card according to any one or a combination of two or more of 1-9 above and 11-12 below, wherein the processor of the active receiver card is configured to perform at least one mathematical operation on the corresponding pixel value.

11. The active receiver card according to any one or a combination of two or more of 1-10 above and 12 below, wherein the processor of the active receiver card is configured to convert an outcome of the at least one mathematical operation to an output that can be interfaced with the second interface.

12. The active receiver card according to any one or a combination of two or more of 1-11 above, wherein the processor of the active receiver card is configured to send corresponding signals to a board of the first tile containing one or more LEDs, to light up the LEDs in correspondence with the outcome of the at least one mathematical operation.

13. A method for controlling with an active receiver card pixels of a display having a plurality of tiles, the active receiver card being electrically connected to a first tile of the plurality of the tiles of the display, the method comprising: receiving by a first interface of the active receiver card a broadcast serialized video data stream as input from a video processing system, the broadcast serialized video data stream including a plurality of portions of the broadcast serialized video data stream, each of the plurality of portions of the serialized video data stream pertaining to a corresponding one of a plurality of tiles of the display, including at least a first tile and a second tile, such the plurality of portions of the serialized video data stream include at least a first portion of the serialized video data stream including video image data pertaining to the first tile of the display and a second portion of the serialized video data stream that includes video image data pertaining to the second tile of the display; extracting, by a processor of the active receiver card, from the received serialized video data stream received by the first interface, the first portion of the serialized video data stream that includes the video image data pertaining to the first tile of the display; and outputting control signals, by a second interface of the active receiver card, to a plurality of pixels of the first tile of the plurality of tiles of the display.

14. The method according to any one or a combination of two or more of 13 above and 15-20 below, wherein the active receiver card receives both the first portion of the broadcast serialized video data stream and the second portion of the broadcast serialized video data stream in a linear manner such that the first portion of the broadcast serialized video data stream is received in a periodic order before the second portion of the broadcast serialized video data stream.

15. The method according to any one or a combination of two or more of 13-14 above and 16-20 below, wherein the active receiver card is configured to receive through the first interface all of the plurality of portions of the broadcast serialized video data stream pertaining to each of plurality of tiles of the display.

16. The method according to any one or a combination of two or more of 13-15 above and 17-20 below, wherein the active receiver card operates asymmetrically with the video processing system such that the broadcast serialized video data stream transmitted downstream from the video processing system is transmitted at a higher bandwidth than a bandwidth of data transmitted upstream to the video processor.

17. The method according to any one or a combination of two or more of 13-16 above and 18-20 below, further comprising storing by a non-volatile memory of the active receiver card at least one (x,y) coordinate of a pixel of the plurality of pixels of the first tile of the display that corresponds to one LED that is mounted on an LED board of the first tile, the at least one (x,y) coordinate corresponding to a particular (x,y) pixel coordinate.

18. The method according to any one or a combination of two or more of 13-17 above and 19-20 below, further comprising determining by the processor of the active receiver card a coordinate (a,b) out of the serialized video data stream, and compare the determined coordinate (a,b) to the at least one (x,y) coordinate of a pixel of the plurality of pixels.

19. The method according to any one or a combination of two or more of 13-18 above and 20 below, further comprising the processor of the active receiver card extracting a corresponding pixel value from the serialized video data stream.

20. The method according to any one or a combination of two or more of 13-19 above, further comprising the processor of the active receiver card performing at least one mathematical operation on the corresponding pixel value.

21. A video processing system comprising: a video processor configured to output a broadcast serialized video data stream to be displayed by a display, the video data being output by the video processor as a plurality of portions of the broadcast serialized video data stream, each of the plurality of portions of the serialized video data stream pertaining to a corresponding one of a plurality of tiles of the display, including at least a first tile and a second tile, such the plurality of portions of the broadcast serialized video data stream include at least a first portion of the serialized video data stream including video image data pertaining to the first tile of the display and a second portion of the serialized video data stream that includes video image data pertaining to the second tile of the display, wherein the video processor outputs both the first portion of the serialized video data stream and the second portion of the serialized video data stream combined as a single data stream to a first receiver card corresponding to the first tile of the display and to a second receiver card corresponding to the second tile of the display.

22. An active receiver card for a display, the active receiver comprising: a processor; a first interface configured to receive a broadcast serialized video data stream as input from a video processing system, wherein the active receiver card is configured to be electrically connected to a first tile of a display; wherein the active receiver card further comprises a second interface configured to output control signals to a plurality of pixels of the first tile of the display; wherein the active receiver card is configured to extract from the received serialized video data stream video image data pertaining to the first tile of the display, and based thereon, the active receiver card is configured to output the control signals to the plurality of pixels of the first tile.

23. An active receiver card for a display, the active receiver comprising: a processor; a first interface configured to receive a broadcast serialized video data stream as input from a video processing system, wherein the active receiver card is configured to be electrically connected to a first tile of a display; wherein the active receiver card further comprises a second interface configured to output control signals to a plurality of pixels of the first tile of the display; wherein the active receiver card is configured to extract from the received broadcast serialized video data stream video image data pertaining to the first tile of the display, the received serial video data stream including additional data not pertaining to the first tile of the display such that the by extracting the video image data pertaining to the first tile of the display, at least some of the additional data of the received serial video data stream is not extracted by the active receiver card, and based on the extracted video image data pertaining to the first tile, the active receiver card is configured to output the control signals to the plurality of pixels of the first tile.

Certain terms are used throughout the description and claims to refer to particular methods, features, or components. As those having ordinary skill in the art will appreciate, different persons may refer to the same methods, features, or components by different names. This disclosure does not intend to distinguish between methods, features, or components that differ in name but not function. The figures are not necessarily drawn to scale. Certain features and components herein may be shown in exaggerated scale or in somewhat schematic form and some details of conventional elements may not be shown or described in interest of clarity and conciseness.

Although various example embodiments have been described in detail herein, those skilled in the art will readily appreciate in view of the present disclosure that many modifications are possible in the example embodiments without materially departing from the concepts of present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination. In addition, other embodiments of the present disclosure may also be devised which lie within the scopes of the disclosure and the appended claims. Each addition, deletion, and modification to the embodiments that falls within the meaning and scope of the claims is to be embraced by the claims.

Certain embodiments and features may have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges may appear in one or more claims below. Any numerical value is "about" or "approximately" the indicated value, and takes into account experimental error and variations that would be expected by a person having ordinary skill in the art.

The invention claimed is:

1. A computing device for a display system,
wherein the computing device is configured to broadcast a serialized video data stream to a plurality of active receiver cards, each of the plurality of active receiver cards being electrically connected respectively to a corresponding tile of the display, the display including a plurality of tiles, each of the active receiver cards being respectively configured to output control signals used to control a plurality of pixels of the tile of the display corresponding to said active receiver card,
wherein the serialized video data stream broadcast by the computing device includes in a serialized format video image data pertaining to each of the plurality of tiles of the display.

2. The computing device according to claim 1, wherein the computing device is a computer, personal computer, laptop, or a device having a graphical engine incorporated therein.

3. The computing device according to claim 1, wherein the computing device broadcasts the serialized video data stream to the plurality of active receiver cards as an asymmetrical communication between the computing device and the active receiver card.

4. The computing device according to claim 1, wherein the computing device broadcasts the serialized video data stream to the plurality of active receiver cards without requiring return communication or without confirmation from the plurality of active receiver cards to the computing device.

5. The computing device according to claim 1, wherein the computing device broadcasts the serialized video data stream to the plurality of active receiver cards such that the broadcast serialized video data stream includes video image data pertaining to a first of said tiles of the display and not pertaining to at least a second of said tiles of the display and the video image data pertaining to a first of said tiles is received by both a first active receiver card corresponding and electrically connected to the first tile of the display and a second active receiver card corresponding to and electrically connected to the second tile of the display.

6. The computing device according to claim 1, wherein the computing device broadcasts the serialized video data stream to the plurality of active receiver cards such that the serialized video data stream transmitted downstream from the computing device is transmitted at a higher bandwidth than a bandwidth of data transmitted upstream to the video processor.

7. The computing device according to claim 1, wherein the computing device is configured to control a LED display, such that the serialized video data stream broadcast by the computing device includes the video image data pertaining to LEDs of the plurality of tiles of the LED display.

8. A display system comprising:
the computing device according to claim 1;
a displaying including a plurality of tiles; and
a plurality of active receiver cards, each of the plurality of active receiver cards being electrically connected respectively to a corresponding tile of the plurality of tiles of the display, ach of the active receiver cards being respectively configured to output control signals used to control a plurality of pixels of the tile of the display corresponding to said active receiver card.

9. The display system according to claim 8, wherein each of the active receiver cards comprise a non-volatile memory that stores at least one (x,y) coordinate of a pixel of the plurality of pixels of the first tile of the display that corresponds to one LED that is mounted on an LED board of the first tile, the at least one (x,y) coordinate corresponding to a particular (x,y) pixel coordinate.

10. The display system according to claim 8, wherein each of the active receiver cards comprise a processor configured to determine a coordinate (a,b) out of the serialized video data stream, and compare the determined coordinate (a,b) to the at least one (x,y) coordinate of a pixel of the plurality of pixels.

11. The display system according to claim 10, wherein the processor of each of the active receiver cards is configured to extract a corresponding pixel value from the serialized video data stream.

12. The display system according to claim 11, wherein the processor of each of the active receiver card is configured to perform at least one mathematical operation on the corresponding pixel value.

13. The display system according to claim 12, wherein the processor of the active receiver card is configured to convert an outcome of the at least one mathematical operation to an output of the active receiver card.

14. The display system according to claim 13, wherein the processor of the active receiver card is configured to send corresponding signals to a board of the first tile containing one or more LEDs, to light up the LEDs in correspondence with the outcome of the at least one mathematical operation.

15. A method for displaying video images on a display system comprising a plurality of tiles, each of the tiles of the display system being respectively controlled with an active receiver card that is electrically connected to a tile of the display, the method comprising:

broadcast with a computing device a serialized video data stream to a plurality of active receiver cards, each of the plurality of active receiver cards being electrically connected respectively to a corresponding tile of the display, the display including a plurality of tiles, each of the active receiver cards being respectively configured to output control signals used to control a plurality of pixels of the tile of the display corresponding to said active receiver card, wherein the serialized video data stream broadcast by the computing device includes in a serialized format video image data pertaining to each of the plurality of tiles of the display.

16. The method according to claim 15, wherein the computing device is a computer, personal computer, laptop, or a device having a graphical engine incorporated therein.

17. The method according to claim 15, wherein the computing device broadcasts the serialized video data stream to the plurality of active receiver cards as an asymmetrical communication between the computing device and the active receiver card.

18. The method according to claim 15, wherein the computing device broadcasts the serialized video data stream to the plurality of active receiver cards without requiring return communication or without confirmation from the plurality of active receiver cards to the computing device.

19. The method according to claim 15, wherein the computing device broadcasts the serialized video data stream to the plurality of active receiver cards such that the broadcast serialized video data stream includes video image data pertaining to a first of said tiles of the display and not pertaining to at least a second of said tiles of the display and the video image data pertaining to a first of said tiles is received by both a first active receiver card corresponding and electrically connected to the first tile of the display and a second active receiver card corresponding to and electrically connected to the second tile of the display.

20. The method according to claim 15, wherein the computing device broadcasts the serialized video data stream to the plurality of active receiver cards such that the serialized video data stream transmitted downstream from the computing device is transmitted at a higher bandwidth than a bandwidth of data transmitted upstream to the video processor.

21. The method according to claim 15, wherein the computing device is configured to control a LED display, such that the serialized video data stream broadcast by the computing device includes the video image data pertaining to LEDs of the plurality of tiles of the LED display.

22. A video processing system comprising:

a video processor configured to broadcast a serialized video data stream to be displayed by a display, the video data being output by the video processor as a plurality of portions of the serialized video data stream, each of the plurality of portions of the serialized video data stream pertaining to a corresponding one of a plurality of tiles of the display, including at least a first tile and a second tile, such the plurality of portions of the broadcast serialized video data stream include at least a first portion of the serialized video data stream including video image data pertaining to the first tile of the display and a second portion of the serialized video data stream that includes video image data pertaining to the second tile of the display, wherein the video processor outputs both the first portion of the serialized video data stream and the second portion of the serialized video data stream combined as a single broadcast data stream to an active first receiver card corresponding to the first tile of the display and to a second active receiver card corresponding to the second tile of the display.

* * * * *